US012387081B1

(12) United States Patent
Olson et al.

(10) Patent No.: US 12,387,081 B1
(45) Date of Patent: Aug. 12, 2025

(54) ACTIVATABLE INDICATOR PLATFORM WITH RFID FOCUS USING MICROENCAPSULATION

(71) Applicant: Temptime Corporation, Morris Plains, NJ (US)

(72) Inventors: John Olson, Dayton, NJ (US); Eric W. Liberato, Pequannock, NJ (US); Brian S. Huffman, Belle Mead, NJ (US); Mohannad Abdo, Clifton, NJ (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 0 days.

(21) Appl. No.: 18/678,228

(22) Filed: May 30, 2024

(51) Int. Cl.
*G06K 19/07* (2006.01)
*G06K 19/077* (2006.01)

(52) U.S. Cl.
CPC ... *G06K 19/07798* (2013.01); *G06K 19/0717* (2013.01); *G06K 19/0723* (2013.01); *G06K 19/07754* (2013.01)

(58) Field of Classification Search
None
See application file for complete search history.

(56) References Cited

U.S. PATENT DOCUMENTS

| 12,196,733 | B2* | 1/2025 | Rigby | G06K 19/07718 |
| 2014/0044609 | A1 | 2/2014 | Prusik et al. | |
| 2020/0221972 | A1* | 7/2020 | Karchin | H01Q 1/2216 |
| 2022/0151266 | A1 | 5/2022 | Bushman | |
| 2022/0283041 | A1* | 9/2022 | Olson | B32B 27/304 |
| 2024/0068886 | A1* | 2/2024 | Huffman | G01K 1/024 |
| 2025/0093214 | A1* | 3/2025 | Huffman | G01K 3/04 |

* cited by examiner

*Primary Examiner* — Steven S Paik
*Assistant Examiner* — April A Taylor
(74) *Attorney, Agent, or Firm* — K&L Gates LLP

(57) ABSTRACT

Activatable indicator platforms for integrated circuits using microencapsulation are disclosed herein. An example activatable indicator platform includes an RFID tag, including an antenna; an integrated circuit, electrically connected to the antenna; an electrical loop having an open state and a closed state, the electrical loop electrically connected to the integrated circuit; an activatable environmental exposure indicator included as a portion of the electrical loop, the indicator having a conductive state and a nonconductive state, such that the electrical loop is in the closed state when the activatable environmental exposure indicator is in the conductive state and the electrical loop is in the open state when the activatable environmental exposure indicator is in the nonconductive state.

23 Claims, 20 Drawing Sheets

ACTIVATABLE INDICATOR PLATFORM WITH RFID FOCUS USING MICROENCAPSULATION

BACKGROUND

Environmental indicators may be configured to indicate the occurrence of an environmental exposure to a host product. Prior to the association between the host product and the indicator, the same level of care must be paid to the indicator to prevent an exposure to the environmental condition which the indicator is configured to indicate, such that the indicator is not spent prematurely and rendered unusable with the host product.

Radio Frequency ID (RFID) tags are commonly used to track products throughout their lifecycle. Combinations of environmental indicators with RFID tags have been previously proposed.

SUMMARY

In an embodiment, the present invention is an RFID tag, including an antenna; an integrated circuit, electrically connected to the antenna; an electrical loop having an open state and a closed state, the electrical loop electrically connected to the integrated circuit; an activatable environmental exposure indicator included as a portion of the electrical loop, the indicator having a conductive state and a nonconductive state, such that the electrical loop is in the closed state when the activatable environmental exposure indicator is in the conductive state and the electrical loop is in the open state when the activatable environmental exposure indicator is in the nonconductive state. The activatable environmental exposure indicator includes a plurality of activable microcapsules, each microcapsule having a conductive particle embedded in a transport material, microencapsulated in a nonconductive shell. The transport material is configured to liquefy responsive to a predetermined environmental exposure. The nonconductive shells are configured to contain the transport material when liquefied. The nonconductive shells are configured to rupture in response to an application of an activation action exceeding a predetermined activation threshold, releasing the indicator material. The activatable environmental exposure indicator transitions to the conductive state when the nonconductive shells are ruptured responsive to the activation action and the transport material is liquefied responsive to the predetermined environmental exposure. The integrated circuit is configured, responsive to the RFID tag being interrogated by an interrogation signal in a predetermined radiofrequency range which is received by the antenna, to engage in a response behavior. The response behavior corresponds to whether the electrical loop is in the open state or the closed state, and the response behavior is selected from a group consisting of cause the antenna to emit a response signal responsive to the interrogation signal when the electrical loop is in the open state, and not emit the response signal responsive to the interrogation signal when the electrical loop is in the closed state, cause the antenna to emit the response signal responsive to the interrogation signal when the electrical loop is in the closed state, and not emit the response signal responsive to the interrogation signal when the electrical loop is in the open state, cause the antenna to emit a first distinct response signal responsive to the interrogation signal when the electrical loop is in the closed state and emit a second distinct response signal responsive to the interrogation signal when the electrical loop is in the open state.

In a variation of this embodiment, the first distinct response signal has a first radiofrequency response, and the second distinct response signal has a second radiofrequency response.

In a variation of this embodiment, the integrated circuit contains a memory, and the first distinct response signal contains a first data stored in the memory, and the second distinct response signal contains a second data stored in the memory.

In a variation of this embodiment, the RFID tag is a passive RFID tag, and the interrogation signal received by the antenna powers the integrated circuit to engage in the response behavior.

In a variation of this embodiment, the RFID tag further includes a battery, wherein the integrated circuit is electrically connected to the battery and powered by the battery.

In a variation of this embodiment, the activation action is thermal stress with a predetermined activation threshold selected from a group consisting of a temperature exceeding 35 degrees Celsius (C), a temperature exceeding 40 degrees C., a temperature exceeding 45 degrees C., a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C., a temperature exceeding 80 degrees C., a temperature exceeding 85 degrees C., a temperature exceeding 90 degrees C., a temperature exceeding 95 degrees C., and a temperature exceeding 100 degrees C.

In a variation of this embodiment, the activation action is a compression stress with a predetermined activation threshold selected from a group consisting of a stress exceeding 0.1 pounds per square inch (psi) a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment, the activation action is a shear stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment, the predetermined environmental exposure is selected from a group consisting of a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time.

In a variation of this embodiment, the conductive particles are selected from a group consisting of particles containing copper, particles containing silver, particles containing graphite, particles containing graphene, particles containing graphene oxide, particles containing other functionalized graphenes, particles containing conductive metals, particles containing conductive non-metal materials, and combinations thereof.

In a variation of this embodiment, the nonconductive shells comprise a material selected from the group consisting of a protein, a gel, a polyurea formaldehyde, a polymelamine formaldehyde, a wax material, an emulsion, other polymeric materials, and combinations thereof.

In a variation of this embodiment, the transport material comprises a material selected from the group consisting of a side-chain crystallizable polymer, an alkane, a wax, an alkane wax, esters, and combinations thereof.

In a variation of this embodiment, each respective transport material is electrically nonconductive when not liquefied, and electrically conductive when liquefied, such that an electrical connection is formed through the liquefied transport material and each respective conductive particle to transition the activatable environmental exposure indicator to the conductive state, and thus transitioning the electrical loop to the closed state.

In a variation of this embodiment, each respective transport material is nonconductive, and the transport material when liquefied facilitates an electrical connection between each respective conductive particle to transition the activatable environmental exposure indicator to the conductive state, and thus transitioning the electrical loop to the closed state.

In a variation of this embodiment, the RFID tag further includes a wicking material abutting the portion of the electrical loop formed by the activatable environmental exposure indicator, the wicking material being permeable with respect to the transport material when liquefied, impermeable with respect to the nonconductive transport material when not liquefied, impermeable with respect to the microcapsules, and impermeable with respect to the conductive particles, such that when the activatable environmental exposure indicator has been subjected to the activation action and subjected to the predetermined environmental exposure, the wicking material draws the liquefied transport material into the wicking material, facilitating the conductive particles to abut one another, facilitating the activatable environmental exposure indicator to transition to the conductive state, and thus transitioning the electrical loop to the closed state.

In a variation of this embodiment, when the electrical loop transitions from the closed state, the transition is irreversible.

In another embodiment, the present invention is provided by an RFID tag, including an antenna; an integrated circuit, electrically connected to the antenna; an electrical loop having an open state and a closed state, the electrical loop electrically connected to the integrated circuit; an activatable environmental exposure indicator included as a portion of the electrical loop, the indicator having a conductive and a nonconductive state, such that the electrical loop is in the closed state when the activatable environmental exposure indicator is in the conductive state and the electrical loop is in the open state when the activatable environmental exposure indicator is in the nonconductive state. The activatable environmental exposure indicator includes a plurality of conductive particles forming an electrical connection such that the activatable environmental exposure indicator is in the conductive state, a wicking material, abutting the plurality of conductive particles. a plurality of activable microcapsules, each microcapsule containing a transport material microencapsulated in a nonconductive shell, activatable microcapsules abutting the conductive particles and opposed to the wicking material. The transport material is configured to liquefy responsive to a predetermined environmental exposure. The nonconductive shells are configured to contain the transport material when liquefied. The nonconductive shells are configured to rupture in response to an application of an activation action exceeding a predetermined activation threshold, releasing the transport material. The activatable environmental exposure indicator transitions to the nonconductive state when the nonconductive shell is ruptured and the transport material is liquefied, and the wicking material draws the transport material and the conductive particles into the wicking material. The integrated circuit is configured, responsive to the RFID tag being interrogated by an interrogation signal in a predetermined radiofrequency range which is received by the antenna, to engage in a response behavior. The response behavior corresponds to whether the electrical loop is in the open state or the closed state, and the response behavior is selected from a group consisting of emit a response signal responsive to the interrogation signal when the electrical loop is in the open state, and not emit the response signal responsive to the interrogation signal when the electrical loop is in the closed state; emit the response signal responsive to the interrogation signal when the electrical loop is in the closed state, and not emit the response signal responsive to the interrogation signal when the electrical loop is in the open state; emit a first distinct response signal responsive to the interrogation signal when the electrical loop is in the closed state and emit a second distinct response signal responsive to the interrogation signal when the electrical loop is in the open state.

In a variation of this embodiment the first distinct response signal has a first radiofrequency response, and the second distinct response signal has a second radiofrequency response.

In a variation of this embodiment the integrated circuit contains a memory, and the first distinct response signal contains a first data stored in the memory, and the second distinct response signal contains a second data stored in the memory.

In a variation of this embodiment the RFID tag is a passive RFID tag, and the interrogation signal received by the antenna powers the integrated circuit to engage in the response behavior.

In a variation of this embodiment, the RFID tag further includes a battery, wherein the integrated circuit is electrically connected to the battery and powered by the battery.

In a variation of this embodiment the activation action is thermal stress with a predetermined activation threshold selected from a group consisting of a temperature exceeding 35 degrees Celsius (C), a temperature exceeding 40 degrees C. a temperature exceeding 45 degrees C. a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C. a temperature exceeding 80 degrees C. a temperature exceeding 85 degrees C., a temperature exceeding 90 degrees C., a temperature exceeding 95 degrees C., and a temperature exceeding 100 degrees C.

In a variation of this embodiment the activation action is a compression stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment the activation action is a shear stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment the predetermined environmental exposure is selected from a group consisting of a temperature excursion above a predetermined temperature threshold for at least a predetermined amount of time, temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time.

In a variation of this embodiment the conductive particles are selected from a group consisting of particles containing copper, particles containing silver, particles containing graphite, particles containing graphene, particles containing graphene oxide, particles containing other functionalized graphenes, particles containing conductive metals, particles containing conductive non-metal materials, and combinations thereof.

In a variation of this embodiment the nonconductive shells comprise a material selected from the group consisting of a protein, a gel, a polyurea formaldehyde, a polymelamine formaldehyde, a wax material, an emulsion, other polymeric materials, and combinations thereof.

In a variation of this embodiment the transport material comprises a material selected from the group consisting of a side-chain crystallizable polymer, an alkane, a wax, an alkane wax, other polymeric materials, esters, and combinations thereof.

In yet another embodiment, the present invention is provided by an RFID tag including an antenna; an integrated circuit, electrically connected to the antenna; an electrical loop having an open state and a closed state, the electrical loop electrically connected to the integrated circuit; an activatable environmental exposure indicator included as a portion of the electrical loop, the indicator having a conductive and a nonconductive state, such that the electrical loop is in the closed state when the activatable environmental exposure indicator is in the conductive state and the electrical loop is in the open state when the activatable environmental exposure indicator is in the nonconductive state. The activatable environmental exposure indicator includes a plurality of activable microcapsules, each microcapsule of the plurality of activatable microcapsules having a respective portion of a conductive adhesive encapsulated in a nonconductive shell of a plurality of nonconductive shells, and a wicking material, abutting the plurality of activatable microcapsules. The conductive adhesive is configured to liquefy responsive to a predetermined environmental exposure. The nonconductive shells are configured to contain the conductive adhesive when the conductive adhesive is liquefied. The nonconductive shells are configured to rupture in response to an application of an activation action exceeding a predetermined activation threshold, releasing the conductive adhesive. The activatable environmental exposure indicator transitions to the conductive state when the nonconductive shell is ruptured responsive to the activation action and the conductive adhesive is liquified responsive to the predetermined environmental exposure, such that the wicking material draws the conductive adhesive into the wick, and an electrical connection is formed through the wick via the conductive adhesive. The integrated circuit is configured, responsive to the RFID tag being interrogated by an interrogation signal in a predetermined radiofrequency range which is received by the antenna, to engage in a response behavior, wherein the response behavior corresponds to whether the electrical loop is in the open state or the closed state, and the response behavior is selected from a group consisting of emit a response signal responsive to the interrogation signal when the electrical loop is in the open state, and not emit the response signal responsive to the interrogation signal when the electrical loop is in the closed state, emit the response signal responsive to the interrogation signal when the electrical loop is in the closed state, and not emit the response signal responsive to the interrogation signal when the electrical loop is in the open state, emit a first distinct response signal responsive to the interrogation signal when the electrical loop is in the closed state and emit a second distinct response signal responsive to the interrogation signal when the electrical loop is in the open state.

In a variation of this embodiment after the activatable environmental exposure indicator transitions to the conductive state, the conductive adhesive cures, securing the wick to the electrical loop, such that the transition is irreversible.

In a variation of this embodiment the first distinct response signal corresponds to a first radiofrequency response, and the second distinct response signal corresponds to a second radiofrequency response.

In a variation of this embodiment the integrated circuit contains a memory, such that the first distinct response signal contains a first data stored in the memory, and the second distinct response signal contains a second data stored in the memory.

In a variation of this embodiment the RFID tag is a passive RFID tag, and the interrogation signal received by the antenna powers the RFID tag, facilitating the response behavior.

In a variation of this embodiment, the RFID tag further includes a battery, wherein the integrated circuit is electrically connected to a battery and powered by the battery.

In a variation of this embodiment the activation action is thermal stress with a predetermined activation threshold selected from a group consisting of a temperature exceeding 35 degrees Celsius (C), a temperature exceeding 40 degrees C. a temperature exceeding 45 degrees C. a temperature exceeding 50 degrees C., a temperature exceeding 55 degrees C., a temperature exceeding 60 degrees C., a temperature exceeding 65 degrees C., a temperature exceeding 70 degrees C. a temperature exceeding 75 degrees C. a temperature exceeding 80 degrees C., a temperature exceeding 85 degrees C., a temperature exceeding 90 degrees C., a temperature exceeding 95 degrees C., and a temperature exceeding 100 degrees C.

In a variation of this embodiment the activation action is a compression stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment the activation action is a shear stress with a predetermined activation threshold selected from a group consisting of a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

In a variation of this embodiment the predetermined environmental exposure is selected from a group consisting of a temperature excursion above a predetermined temperature threshold for at least a predetermined amount of time, temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time.

In a variation of this embodiment the conductive adhesive comprises a material selected from a group consisting of particles containing copper, particles containing silver, particles containing graphite, particles containing graphene, particles containing graphene oxide, particles containing other functionalized graphenes, particles containing conductive metals, particles containing conductive non-metal materials, and combinations thereof.

In a variation of this embodiment the nonconductive shells comprise a material selected from the group consisting of a protein, a gel, a polyurea formaldehyde, a polymelamine formaldehyde, a wax material, an emulsion, other polymeric materials, and combinations thereof.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed technology and explain various principles and advantages of those embodiments.

Figure 1:
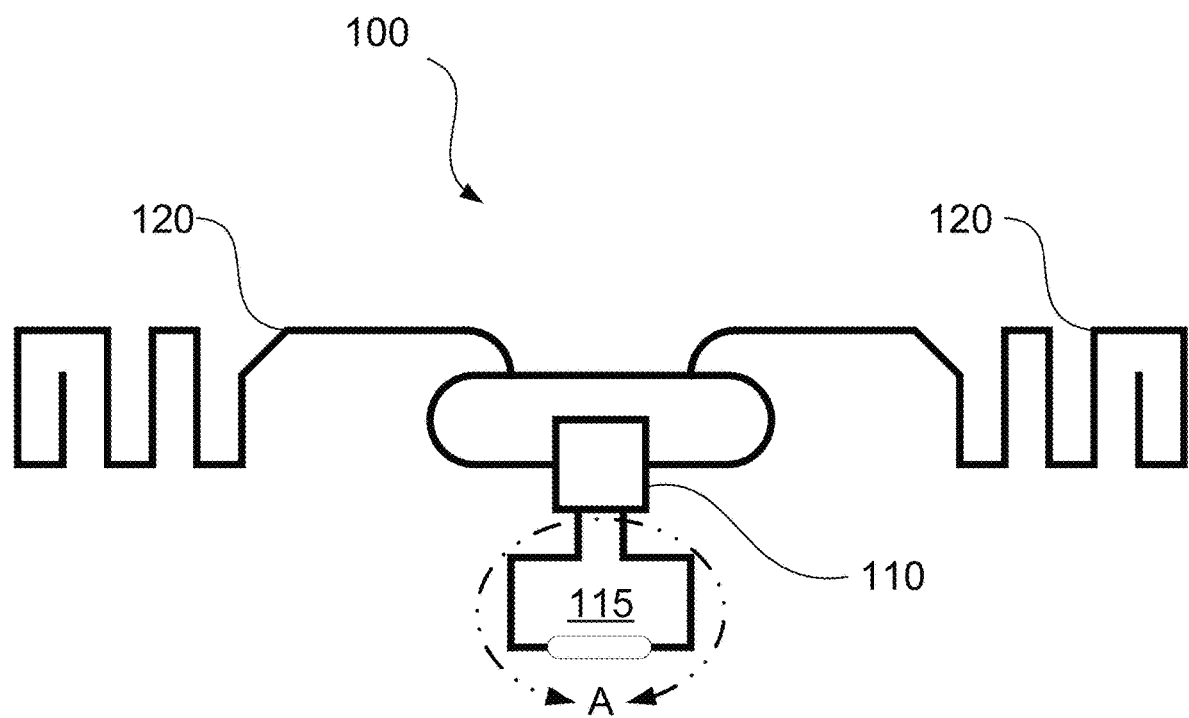
FIG. 1 illustrates an RFID tag, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

In the Figures, certain conductive components include an illustrated lightning bolt symbol. The lightning bolt symbol is intended for symbolic use to indicate that a component is conductive. The lightning bolt symbol does not represent a physical feature of a given component with which the symbol is associated and is indicative only of the conductive properties of the given component.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The technology of the present disclosure is related to an activatable indicator platform with a radiofrequency identification (RFID) focus, using microencapsulation technology. Environmental indicators (e.g., indicators incorporating a liquefying indicator material) may be configured to indicate the occurrence of an environmental exposure to a host product. Prior to the association between the host product and the indicator, the same level of care must be paid to the indicator to prevent an exposure to the environmental condition of which the indicator is configured to indicate, such that the indicator is not spent prematurely and rendered unusable with the host product. Said differently, if a thermal indicator is to be installed on a host product, the indicator must be held below the temperature which the thermal indicator is configured to indicate prior to installation on the host product. If a sufficient thermal exposure were to occur, the indicator would transition to an indicative state prior to installation, and, provided the indicator is an irreversible indicator, the indicator would be expended prior to use. For example, indicators configured for use with refrigerated items, e.g., indicators showing when host products have warmed above a refrigerator temperature, generally need to be refrigerated prior to being paired with a host product, which results in an additional cost and more complicated inventory management and manufacturing process to the user.

The technology of the present disclosure provides a solution to the above-described issue, in the form of an activatable environmental indicator, which does not respond to a predetermined environmental exposure until an activation action has been applied to the indicator. Using microencapsulation techniques, an indicator material may be contained in microcapsules, where the microcapsules are configured to be ruptured or disengaged responsive to an activation action. The microcapsules protect the indicator material from responding to exposure to the environment and are capable of retaining the indicator material within the microcapsule regardless of the phase of the material (e.g. liquid, solid, gel, etc.). Even if a melting indicator material melts, while it is encapsulated, it does not flow, which may prevent the material from producing its indicating function, such as changing conductivity in a circuit or providing a color transition to a region. In this manner, prior to transitioning to an indicative state, the indicator must be activated by providing the activation action, and also exposed to the predetermined environmental exposure. Thus, premature expenditure of sensitive indicators may be effectively reduced.

FIG. 1 illustrates an RFID tag 100, according to embodiments of the present disclosure. The RFID tag 100 includes an integrated circuit 110, which includes an electrical loop 115. The RFID tag further includes antennas 120 which may be configured to send and receive radiofrequency (RF) signals to an RFID reader (not shown). The antennas 120 may be electrically connected to the integrated circuit 110. As used herein, the term "electrically connected" (and variations across parts of speech) may mean that the referenced elements are directly or indirectly connected in such a way as to allow electric current to flow between them. In some examples, the RFID tag 100 is a passive tag, such that the RF signals received by the antennas 120 may be used to provide power to the RFID tag 100 and allow the RFID tag 100 to transmit an RF signal, via the antennas 120, in response to the received RF signal. In other embodiments, e.g., an active RFID tag, the integrated circuit may include an electrical connection to a battery, or other power source capable of powering the RFID tag 100 to transmit an RF signal without having first received an interrogative RF signal. The integrated circuit 110 may contain a variety of circuitry components, which may include a memory in which data is contained, such that the RFID tag 100 is capable of transmitting the data contained in the memory to an RFID reader.

Figure 2:
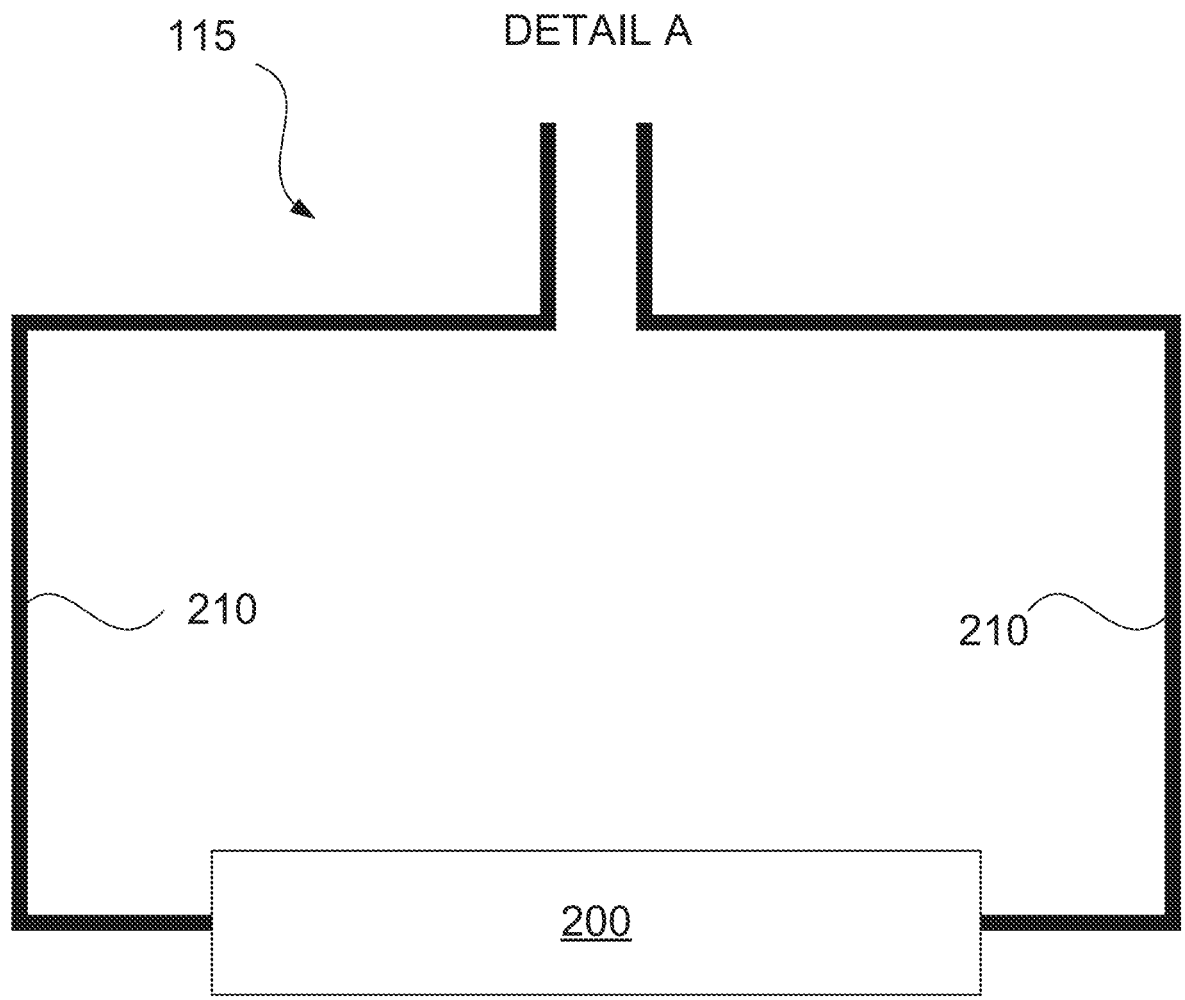
FIG. 2 illustrates an electrical loop that is part of the RFID tag, according to embodiments of the present disclosure.

FIG. 2 illustrates a detailed view of Detail A of FIG. 1, in which an electrical loop 115 (e.g. electrical loop) is illustrated, according to embodiments of the present disclosure. The electrical loop 115 may include a circuit trace or wire 210, or other form of electrical connectivity, where a portion of the electrical loop is formed by an activatable environmental indicator 200 (e.g. activatable environmental exposure indicator, indicator). In some examples, the activatable environmental indicator 200 has a conductive state and a nonconductive state. In the conductive state, the activatable environmental indicator 200 provides an electrical connection across the wire 210 (e.g., forming a bridge between terminal ends of the wire), such that electricity is conducted throughout the electrical loop 115 and the electrical loop 115 is closed (e.g. in the closed state). In the nonconductive state, the activatable environmental indicator 200 resists, or otherwise substantially prevents electrical connection across the wire 210 (e.g., electrically isolates one terminal end of the wire 210 from the other terminal end 210 of the wire), and electricity is not conducted through the electrical loop 115 (or is conducted at too low a level to have a desired effect in a circuit), and the electrical loop 115 is open (e.g., in the open state).

The integrated circuit 110 may determine a state of the electrical loop 115 (e.g., open or closed) when the integrated circuit 110 is activated and cause the antenna to engage in one of a set of response behaviors dependent on the state of the electrical loop 115 (open or closed). In some examples, the set of response behaviors includes the RFID tag 100 emitting an RF signal when the electrical loop 115 is open, but not emitting an RF signal when the electrical loop 115 is closed, or conversely, the RFID tag 100 emitting an RF signal when the electrical loop 115 is closed but not emitting an RF signal when the electrical loop 115 is open. In some examples, the set of response behaviors includes the RFID tag 100 emitting a first distinct RF signal when the electrical loop 115 is closed and emitting a second distinct RF signal when the electrical loop 115 is open, e.g., transmitting a different value, or transmitting on a different frequency. In some examples a first distinct RF signal may have a first frequency, and the second RF signal may have a second frequency, distinct from the first frequency. In some examples the integrated circuit 110 may include a memory configured to store one or more data, and the first distinct RF signal may contain a first data stored in the memory of the integrated circuit 110, and the second distinct RF signal may contain a second data, distinct from the first data, stored in the memory of the integrated circuit 110, contain the first data stored in the memory of the integrated circuit 110, or omit the first data stored in the memory of the integrated circuit 110. According to some embodiments, the set of response behaviors may include other behaviors than those described above, and combinations of and with the above behaviors.

Figure 3:
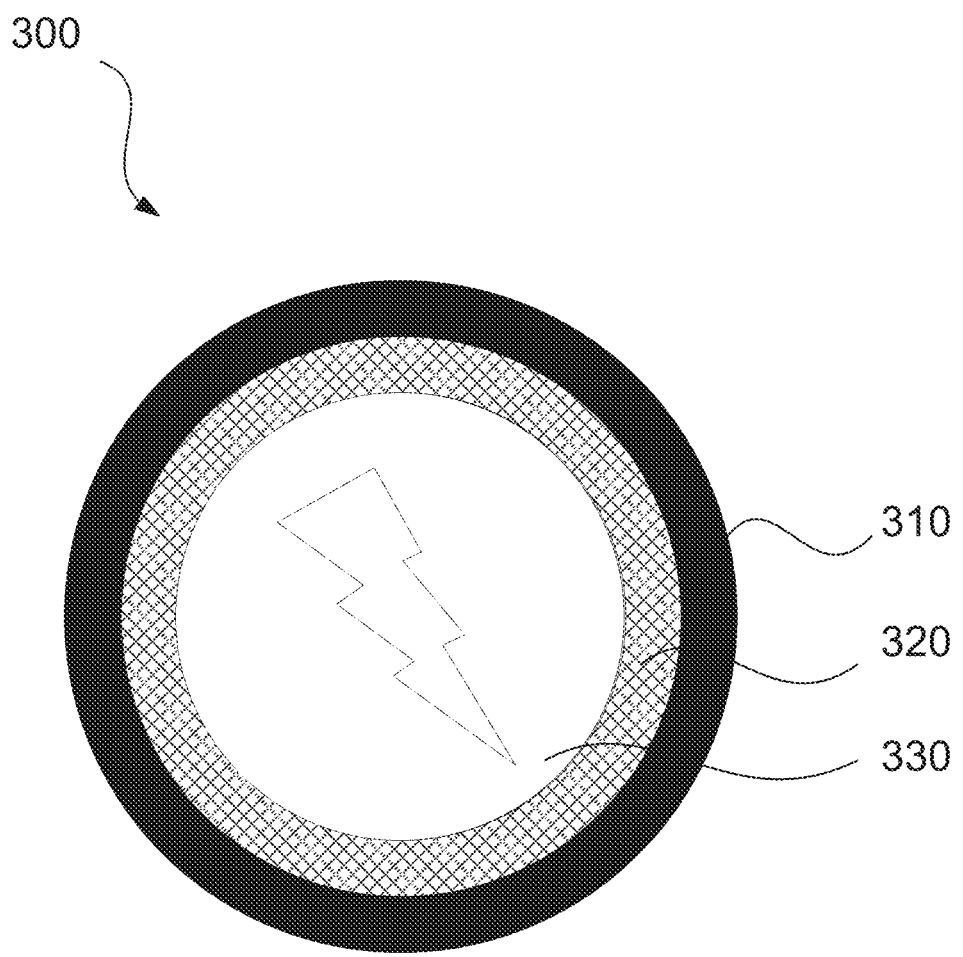
FIG. 3 illustrates a microcapsule, according to embodiments of the present disclosure.

FIG. 3 illustrates a cross sectional view of a microcapsule 300, where the microcapsule 300 may be a component employed in various embodiments of the activatable environmental indicator 200, according to embodiments of the present disclosure. According to some embodiments the microcapsule 300 (e.g. microsphere) includes a conductive particle 330 surrounded by a transport material 320. The particle 330 and transport material 320 are microencapsulated in an activatable shell 310. It will be appreciated that the particle could be smaller in relation to the microcapsule, and multiple microcapsules could be embedded in the transport material in a single microcapsule, either as a single integrated piece, or each with their own separate portion of the transport material.

The microcapsule 300 may be any size, but in one such embodiment, has an outer diameter length between 50 to 750 μm. The shell 310 may be any size smaller than or equal to the outer diameter of the microcapsule 300, but in one such embodiment, has an outer diameter length between 5 to 25 micrometers (μm). The payload, or the ratio of the total weight of the contents (e.g. conductive particle 330, transport material 320, conductive adhesive 1610 (See FIG. 16)) within the microcapsule 300 to the entire weight microcapsule 300 including the contents contained within the microcapsule 300, can range from 50 percent to 90 percent. It will be appreciated that a variety of microcapsule shell 310 materials may be chosen, depending on the application, the type of activation, and the nature of the contents of the microcapsule 300. In general, the microcapsules 300 should resist the passage, whether by flow, diffusion, or migration, of the contents of the microcapsule 300 prior to an activation action.

For example, the shell 310 may be formed in whole or in part by a wax, e.g., an alkane wax, or other acid resistant compound having a relatively high melting point, e.g., fatty acid amide, an ester or Elvax EVA resin. For example, the melting point may be in a range of about 50 degrees Celsius (C) to about 300 degrees C., from about 100 degrees C. to about 300 degrees C., from about 150 degrees C. to about 300 degrees C., from about 200 degrees C. to about 300 degrees C., from about 250 degrees C. to about 300 degrees C. Generally, the shell should have a higher melting point than the maximum temperature the microcapsule is expected to be exposed to in normal use, to prevent it from rupturing or melting prematurely.

In another example, the shell 310 may be formed in whole or in part by a polymer coating having a high glass transition temperature ($T_g$) e.g. Polysulfone. For example, the glass transition temperature may be in a range of about 50 degrees C. to about 300 degrees C., from about 100 degrees C. to about 300 degrees C., from about 150 degrees C. to about 300 degrees C. from about 200 degrees C. to about 300 degrees C. from about 250 degrees C. to about 300 degrees C. For example, Polysulfone, with a $T_g$ of about 190 C may be used. In additional examples, the microcapsules 104 may be one of Styrene Maleic Anhydride (SMA), Polyphenylene Ether (PPE), Cellulose Acetate, Cellulose Diacetate, Polyacrylate, Polyamide, Polycarbonate, polyether ether ketone, Polyether Sulfone, PET, PFA, polymethyl methacrylate (PMMA) or Polyimide.

In another example, the shell 310 may be formed in whole or in part by a low molecular weight polymer gel having a high melting point, e.g., fatty acid amide, an ester or Elvax EVA resin. For example, the melting point may be in a range of about 100 degrees C. to about 300 degrees C. from about 150 degrees C. to about 300 degrees C. from about 200 degrees C. to about 300 degrees C., from about 250 degrees C. to about 300 degrees C. Additionally, in some examples, the polymer gel has a molecular weight in a range from about 1 grams per mole (g/mol) to 100,000 g/mol, from about 3,500 g/mol to 6,000 g/mol and from about 200 g/mol to 2,000 g/mol.

Alternatively, the shell 310 may be formed in whole or in part by a gel, gelatin, protein, polyurea formaldehyde, polymelamine formaldehyde, wax material, melamine, or an emulsion. The microcapsules may be available in wet and dry formulations. Polymelamine and polyurea formaldehyde can both be used for encapsulations via interfacial polymerization, which uses two immiscible phases. Once separated in the same vessel, a reaction is initiated at the interface of the two immiscible phases in the presence of an initiator and the material to be encapsulated. As polymerization occurs, microcapsules form around the core material. The microcapsule 300 releases the contents of the microcapsule 300 upon rupturing.

The microcapsule 300 is initially in an unactivated form, capable of being configured to transition to an activated form when activated through exposure to an activation action, e.g., the application of heat, pressure, and/or heat and pressure exceeding a predetermined threshold. In the unactivated form, the shell 310 of the microcapsule 300 maintains separation between the contents of the microcapsule 300 and any external environmental stimuli and/or contains a phase change of the contents of the microcapsule 300 in response to any external environmental stimuli.

The microcapsule 300 may be "activated" or ruptured by exposing the microcapsule 300 to an activation action (e.g. activation stress, activation exposure, activation event, etc.) exceeding a predetermined activation threshold. The activation action may cause the microcapsule 300 to fracture, melt, break, dissolve, sublime, become porous, or otherwise disengage, allowing the release of the contents of the microcapsule 300.

According to some embodiments, the activation action may be an application of at least one of an activation heat and an activation pressure. In some examples, the temperature threshold for activation may be from about 0 degrees C. to 300 degrees C., from about 90 degrees C. to 110 degrees C., from about 100 degrees C. to 200 degrees C. from about 100 degrees C. to 300 degrees C., and from about 200 degrees C. to 300 degrees C.

In some examples, where the activation action is a thermal stress, the temperature threshold for activation may be a temperature exceeding about 35 degrees C., a temperature exceeding about 40 degrees C. a temperature exceeding about 45 degrees C., a temperature exceeding about 50 degrees C., a temperature exceeding about 55 degrees C., a temperature exceeding about 60 degrees C., a temperature exceeding about 65 degrees C., a temperature exceeding about 70 degrees C., a temperature exceeding about 75 degrees C. a temperature exceeding about 80 degrees C. a temperature exceeding about 85 degrees C., a temperature exceeding about 90 degrees C., a temperature exceeding about 95 degrees C., and a temperature exceeding about 100 degrees C. It will be appreciated that the activation heat ranges given are purely exemplary and the microcapsules 300 can be formed to respond to other temperature ranges.

Activation may be achieved by applying a high temperature for a very short interval, e.g., a few milliseconds. For example, the mass or heat of fusion of the indicator may be much greater than the mass or heat of fusion of a barrier that needs to be removed, allowing a short exposure to high temperature to remove or alter the microcapsule 300 without significantly affecting the contents of the microcapsule 300.

In some cases, pressure may also contribute to the activation, e.g., by breaking microcapsules 104, either alone or in combination with elevated temperature. In such embodiments, the activation action is a compressive stress, or a shearing stress, where the predetermined activation threshold is a stress exceeding about 0.1 pounds per square inch (psi), a stress exceeding about 0.5 psi, a stress exceeding about 1 psi, a stress exceeding about 2 psi, a stress exceeding about 5 psi, a stress exceeding about 10 psi, or a stress exceeding about 15 psi.

The activation action may include the application of heat to reach an activation temperature, the application of an activation pressure, or a combination thereof (e.g., by a thermal printhead). In some examples, the temperature threshold for activation may be from about −40° C. to 100° C., from about 5° C. to 35° C., from about 0° C. to 300° C., from about 90° C. to 110° C., from about 100° C. to 200° C., from about 100° C. to 300° C., and from about 200° C. to 300° C. Activation may be achieved by applying a high temperature for a very short interval, e.g., a few milliseconds. In this manner, even if the temperature needed to activate the device exceeds the temperature that a temperature exposure indicator is configured to indicate, the exposure may be so short that the indicator itself is not affected. For example, the mass or heat of fusion of the indicator may be much greater than the mass or heat of fusion of a barrier that needs to be removed, allowing a short exposure to high temperature to remove or alter the microcapsule 300 without significantly affecting the contents of the microcapsule 300. Typical thermal print heads have temperatures in the range from about 100° C. to 300° C., which may be tuned downward for select applications to from about 100° C. to 200° C. They are typically exposed to the thermal print heads for a brief period of time, for example a few milliseconds. The microcapsule 300 itself responds when it reaches a temperature of in a range from about −40° C. to 100° C., from about 5° C. to 35° C., from about 0° C. to 300° C., from about 90° C. to 110° C., from about 100° C. to 200° C., from about 100° C. to 300° C., and from about 200° C. to 300° C. It will be appreciated that the activation temperature ranges given are purely exemplary and other ranges may be sufficient to activate the microcapsules 135, where such pressure ranges may vary based on a composition of the shell 136, a thickness of the shell 136, a ratio between the shell thickness or weight to volume or weight of the indicator material, a diameter of the microcapsules, a temperature applied to the shells, etc. In some cases, pressure may also contribute to the activation, e.g., by breaking microcapsules 300, either alone like an impact printer, or in combination with elevated temperature. In some examples, the activation pressure required to activate the microcapsules 135 may be from about 1.5 to 8 pounds per square inch or from about 4 to 15 pounds per square inch. It will be appreciated that the activation pressure ranges given are purely exemplary and other ranges may be sufficient to activate the microcapsules 300, where such pressure ranges may vary based on a composition of the shell 310, a thickness of the shell 310, a ratio between the shell thickness or weight to volume or weight of the indicator material, a diameter of the microcapsules, a temperature applied to the shells, etc.

According to some embodiments, the shell 310 is electrically nonconductive, insulative, resistive, or otherwise resists, and may substantially prevent the conduction of electricity through the microcapsule 300.

The microcapsule 300 can include a transport material 320, according to embodiments of the present disclosure. The transport material 320 may be any such material capable of exhibiting a phase change (e.g. liquefying) from a substantially solid phase (e.g., solid, highly viscous, gelled) to a liquid phase upon the occurrence of a predetermined environmental stimulus (e.g., predetermined environmental exposure). As used herein, the term "solid phase" is used to describe the non-liquefied state of the transport material 320, and may refer to a gelled state, a highly viscous state, or a solid state where the transport material 320 is incapable of fluid flow. As used herein, the term "liquid phase" is used to describe the liquefied state of the transport material 320 and refers to a state in which the transport material is capable of fluid flow. In some embodiments, there may be combinations of different transport materials 320 contained within microcapsules 300. This may include multiple types of microcapsules 300 containing multiple types of transport materials 320. The different transport materials 320 may be placed into microcapsules 300 to keep the transport materials 320 from premature contact with each other.

The microcapsules 300 may be utilized in order to prevent wicking, or migration, of the transport material 320 prior to subjection to an activation stress even when the transport material 320 encapsulated in the microcapsules is exposed to the predetermined environmental stimulus. Alternatively, the microcapsule 300 may insulate the environmental indicator from the predetermined environmental stimulus.

According to some embodiments, the predetermined environmental stimulus may be one of a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an predetermined electromagnetic exposure, a humidity exposure, an exposure to a humidity level above a predetermined threshold, and an exposure to a humidity level above a predetermined threshold for at least a predetermined amount of time, combinations thereof, and the like.

In one embodiment, the transport material 320 is a meltable solid configured to melt in response to a temperature above a predetermined threshold, forming a liquid. In another embodiment, the transport material 320 is a gel configured to, in response to a predetermined environmental exposure above a predetermined threshold, change viscosity such that the gel is substantially liquefied and is capable of fluid flow. For example, the material may be a side-chain crystallizable polymer combined with an alkane wax. Some side-chain crystallizable (SCC) polymers useful in the practice of the present disclosure, alone or in combination, and methods that can be employed for preparing them, are described in O'Leary et al. "Copolymers of poly(n-alkyl acrylates): synthesis, characterization, and monomer reactivity ratios" in Polymer 2004 45 pp 6575-6585 ("O'Leary et al." herein), and in Greenberg et al. "Side Chain Crystallization of n-Alkyl Polymethacrylates and Polyacrylates" J. Am. Chem. Soc., 1954, 76 (24), pp. 6280-6285 ("Greenberg et al." herein). The disclosure of each of O'Leary et al. and Greenberg et al. is incorporated by reference herein for all purposes.

Side-chain crystallizable polymers, sometimes called "comb-like" polymers, are well-known and available commercially. These polymers are reviewed in J. Polymer Sci. Macromol. Rev. 8:117-253 (1974), the disclosure of which is hereby incorporated by reference. In general, these polymers contain monomer units X of the formula:

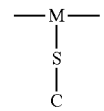

where M is a backbone atom, S is a spacer unit and C is a crystallizable group. These polymers have a heat of fusion ($\Delta H_f$) of at least about 20 Joules/g, preferably at least about 40 Joules/g. The polymers will contain about 50 to 100 percent monomer units represented by "X". If the polymer contains less than 100 percent X, it will in addition contain monomer units which may be represented by "Y" or "Z", or both, wherein Y is any polar or nonpolar monomer or mixture of polar or nonpolar monomers capable of polymerizing with X and/or Z, and wherein Z is a polar monomer or mixture of polar monomers. Polar groups, e.g., polyoxyalkylenes, acrylates including hydroxyethylacrylate, acrylamides including methacrylamide-will typically increase adhesion to most substrates. If the polar species "Z" is acrylic acid, it is preferred that it comprise about 1-10 wt. percent of the polymer.

The backbone of the polymer (defined by "M") may be any organic structure (aliphatic or aromatic hydrocarbon, ester, ether, amide, etc.) or an inorganic structure (sulfide, phosphazine, silicone, etc.), and may include spacer linkages which can be any suitable organic or inorganic unit, for example ester, amide, hydrocarbon, phenyl, ether, or ionic salt (e.g., a carboxyl-alkyl ammonium or sulphonium or phosphonium ion pair or other known ionic salt pair).

The side-chain (defined by 'S' and 'C') may be aliphatic or aromatic or a combination of aliphatic and aromatic, but must be capable of entering into a crystal line state. Common examples are: linear aliphatic side chains of at least 10 carbon atoms, e.g., $C_4$-$C_{22}$ acrylates or methacrylates, acrylamides or methacrylamides, vinyl ethers or esters, siloxanes or alpha olefins; fluorinated aliphatic side-chains of at least 6 carbons; and p-alkyl styrene side-chains wherein the alkyl is of 8 to 24 carbon atoms.

The length of the side-chain moiety is usually greater than 5 times the distance between side-chains in the case of acrylates, methacrylates, vinyl esters, acrylamides, methacrylamides, vinyl ethers and alpha olefins. In the extreme case of a fluoroacrylate alternate copolymer with butadiene, the side-chain can be as little as two times the length as the distance between the branches.

In any case, the side-chain units should make up greater than 50 percent of the volume of the polymer, preferably greater than 65 percent of the volume. Specific examples of side-chain crystallizable monomers are the acrylate, fluoroacrylate, methacrylate and vinyl ester polymers described in J. Poly. Sci 10:3347 (1972); J. Poly. Sci 10:1657 (1972); J. Poly. Sci 9:3367 (1971); J. Poly. Sci 9:3349 (1971); J. Poly. Sci. 9:1835 (1971); J.A.C.S. 76:6280 (1954); J. Poly, Sci 7:3053 (1969); Polymer J. 17:991 (1985), corresponding acryl amides, substituted acrylamide and maleimide polymers (J. Poly. Sci: Poly. Physics Ed. 18:2197 (1980); polyalphaolefin polymers such as those described in J. Poly. 5,156,911 7 Sci. Macromol. Rey, 8:117-253 (1974) and Macromolecules 13:12 (1980), polyalkylvinylethers, polyalkylethylene oxides such as those described in Macromolecules 13:15 (1980), alkylphosphazene polymers, polyamino acids such as those described in Poly. Sci. USSR 21:241, Macromolecules 18:2141. polyisocyanates such as those described in Macromolecules 12:94 (1979), polyurethanes made by reacting amine- or alcohol-containing monomers with long-chain alkyl isocyanates, polyesters and polyethers, polysiloxanes and polysilanes such as those described in Macromolecules 19:611 (1986), and p-alkyl-styrene polymers such as those described in J.A.C.S. 75:3326 (1953) and J. Poly. Sci 60:19 (1962). Of specific utility are polymers which are both relatively polar and capable of crystallization, but wherein the crystallizing portion is not affected by moisture. For example, incorporation of polyoxyethylene, polyoxy propylene, polyoxybutylene or copolyoxyalkylene units in the polymer will make the polymer more polar.

In a particularly preferred embodiment herein, in the above structure, —C is selected from the group consisting of —(CH$_2$)—CH$_3$ and —(CF$_2$)$_n$—CF$_2$H, where n is an integer in the range of 8 to 20 inclusive, —S— is selected from the group consisting of —O—, —CH$_2$—, —(CO)—, —O(CO)— and —NR— where R is hydrogen or lower alkyl (1-6C), and -M- is —[(CH$_2$)$_m$—CH]— where m is 0 to 2.

Typical "Y" units include linear or branched alkyl or aryl acrylates or methacrylates, alpha olefins, linear or branched alkyl vinyl ether or vinyl esters, maleicesters or itaconic acid esters, acrylamides, styrenes or substituted styrenes, acrylic acid, methacrylic acid and hydrophilic monomers as detailed in WO84/0387, cited supra.

Some useful side-chain crystallizable polymers, and monomers for preparing side-chain crystallizable polymers, are also available from commercial suppliers, for example, Scientific Polymer Products, Inc., Ontario, N.Y., Sigma-Aldrich, Saint Louis, Mo., TCI America, Portland Oreg., Monomer-Polymer & Dajac Labs, Inc., Trevose, Pa., San Esters Corp., New York, N. Y., Sartomer USA, LLC, Exton Pa., and Polysciences, Inc. Other materials may be SCCs alone, without SCCs, or alkane waxes blended without SCCs.

According to some embodiments the transport material 120 may include any or multiple of a side-chain crystallizable polymer, an alkane, a wax, an alkane wax, esters, and combinations thereof.

According to some embodiments, the transport material 320 is electrically nonconductive, insulative, resistive, or otherwise resists or substantially prevents the conduction of electricity through the transport material 320. In some examples, the transport material 320 is electrically conductive, and facilitates the conduction of electricity through the transport material 320. In some examples, the transport material 320 is electrically nonconductive when in one of the liquid phase and the solid phase, and is electrically conductive when in the other of the liquid phase and the solid phase. In some examples the carrier material has a first electrical conductivity when in one of the solid phase, the liquid phase, and a first viscous state, and has a second electrical conductivity in another of the solid phase, the liquid phase, and a second viscous state.

According to some embodiments, the microcapsule 300 includes a conductive particle 330. In some examples the microcapsule 300 includes a plurality of conductive particles 330. Conductive particles 330 may include particles of conductive metals, such as copper, silver, gold, aluminum, zinc, tin, similar metals, and alloys thereof. The conductive particles 330 may also or alternatively include particles of graphene, graphite, graphene oxides, and other functionalized graphenes, and particles containing conductive nonmetals. It will be appreciated that the conductive particles 330 may be formed in whole or in part by any electrically conductive substance or material operable to be particlized to a sufficient size to fit within the shell 310 of the microcapsule 300.

FIGS. 4-10 illustrate embodiments of activatable environmental indicator 200 employing the microcapsules 300 as discussed in reference to FIG. 3.

First Embodiment

Figure 4:
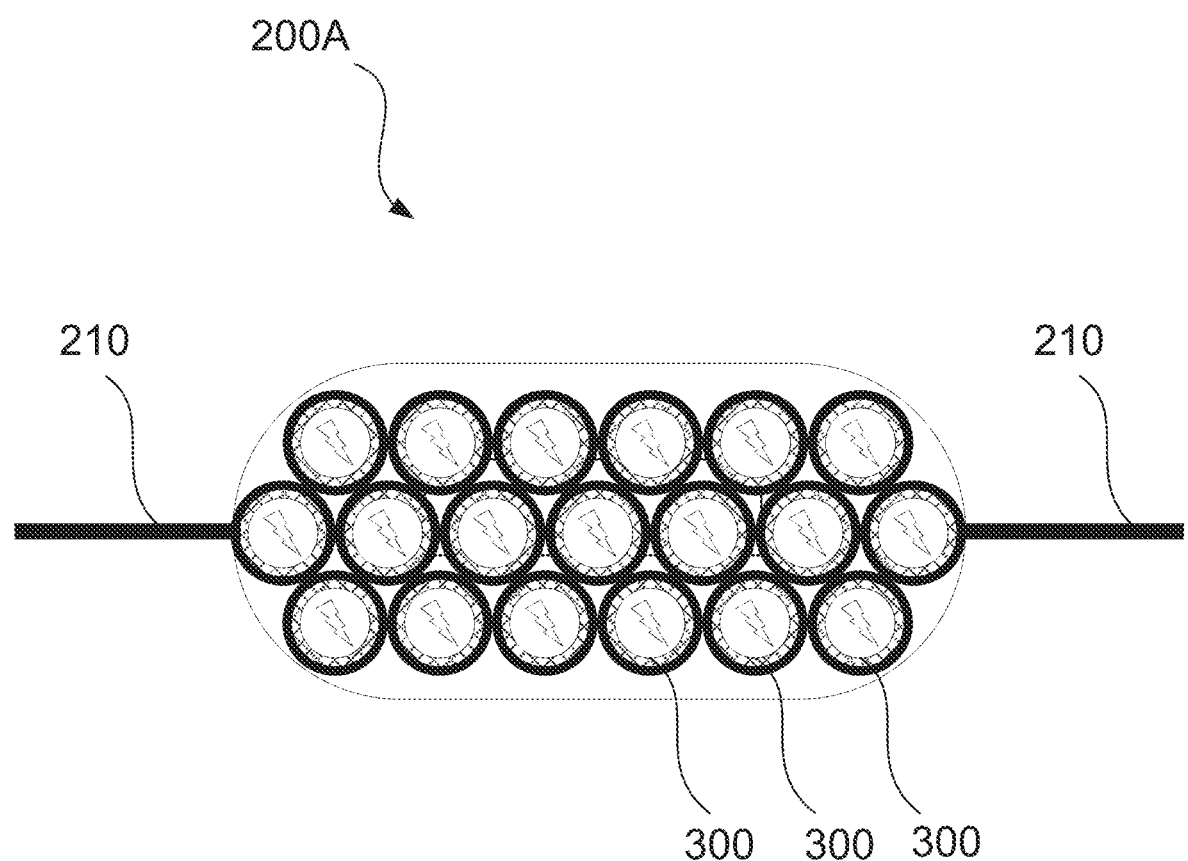
FIGS. 4-6 illustrate various conductive states of a first embodiment of an activatable environmental indicator which is part of the electrical loop of the RFID tag, according to embodiments of the present disclosure.
Figure 5:
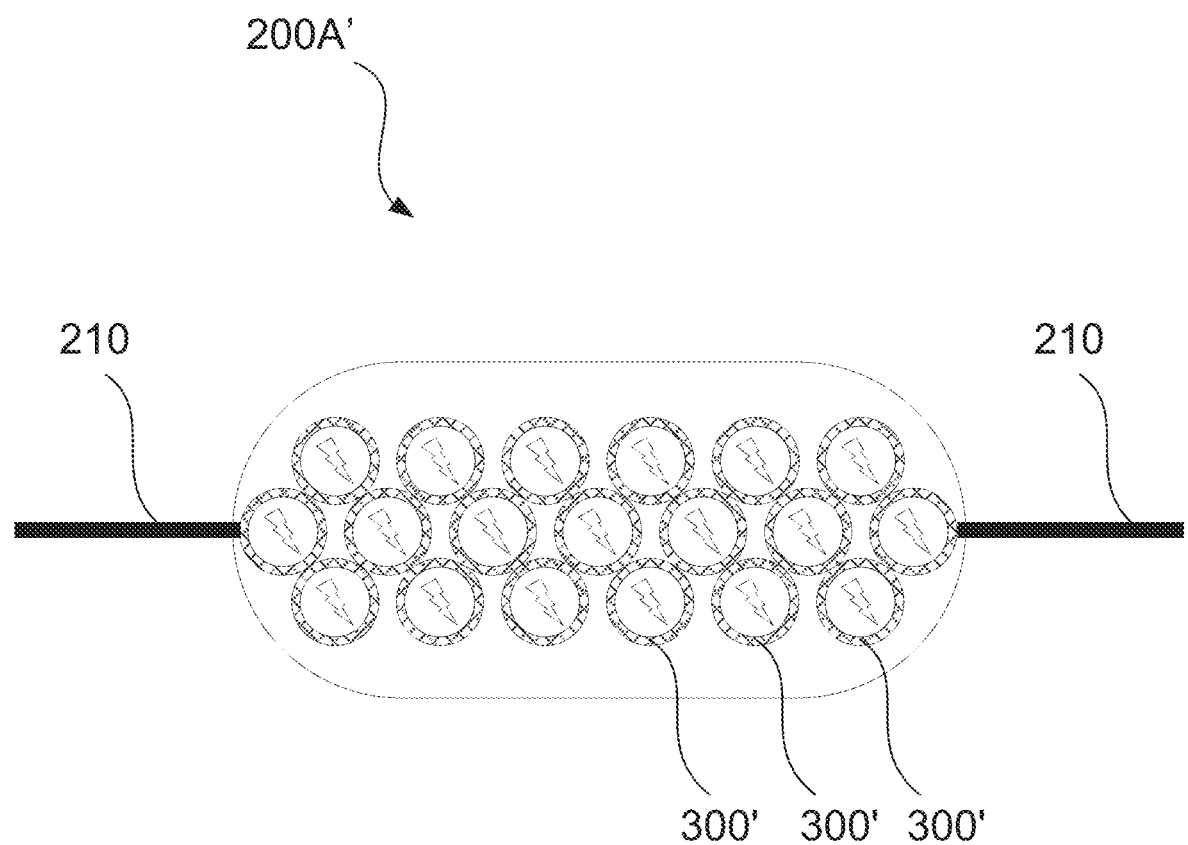
Figure 6:
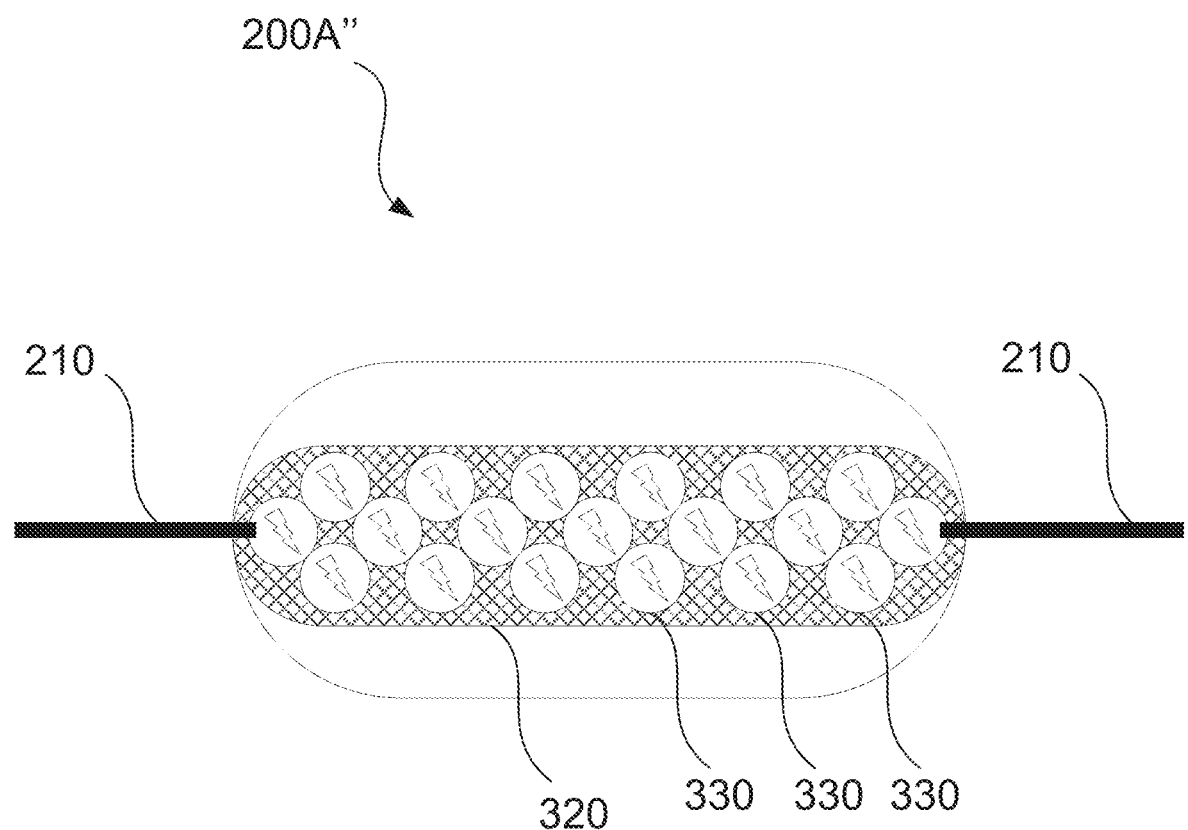

FIGS. 4-6 illustrate a first embodiment 200A of the activatable environmental indicator 200, according to embodiments of the present disclosure. As illustrated in FIG. 4, the first embodiment 200A, among other embodiments of the activatable environmental indicator 200 may include a plurality of microcapsules 300, each microcapsule 300 including a conductive particle 330 contained (e.g., suspended, embedded) within a transport material 320, microencapsulated in an activatable shell 310. The first embodiment 200A has an unactivated nonconductive state (200A, FIG. 4), an activated nonconductive state (200A), FIG. 5) and an activated conductive state (200A", FIG. 6). According to some examples, the first embodiment 200A undergoes a transition from the nonconductive state to the conductive state, responsive to the environmental stimulus, (e.g., following activation).

FIG. 4 illustrates the unactivated nonconductive state of the first embodiment 200A of the activatable environmental indicator 200, according to embodiments of the present disclosure. In the unactivated nonconductive state, the shells 310 of the microcapsules resist, or substantially prevent, electrical connection across the wire 210 and through the activatable environmental indicator 200, such that the indicator is in the nonconductive state, and the electrical loop 115 is closed. In the unactivated state, the transport material 320 and conductive particles 330 are contained within the shells 310 of the microcapsule. In the unactivated nonconductive state, the transport material 320 may be in the liquid phase or the solid phase but is nonetheless contained by the shells 310.

FIG. 5 illustrates the activated nonconductive state of the first embodiment 200A' of the activatable environmental indicator 200, according to embodiments of the present disclosure. After an application of an activation stress (e.g., heat, pressure, etc.) the shells 310 of the microcapsules 300 rupture or otherwise disengage, releasing the transport material 320, becoming ruptured microcapsules 300'. In some examples, the transport material 320 may be non-conductive in the solid phase, and electrical connection across the wire 210 and through the activatable environmental indicator 200 is still substantially prevented by the transport material 320, such that the activatable environmental indicator 200 remains in the nonconductive state, and the electrical loop 115 is open.

FIG. 6 illustrates the activated conductive state of the first embodiment 200A" of the activatable environmental indicator 200, according to embodiments of the present disclosure. After an exposure to a predetermined environmental stimulus (e.g., as discussed in Detailed Description of FIG. 3), the transport material 320 of the ruptured microcapsules 300' liquefies. The conductive particles 330, which were previously held in a solid matrix by the transport material 320 in the solid phase when the activatable environmental indicator 200 was in the unactivated nonconductive state and the activated nonconductive state, are operable to move throughout the liquid transport material 320 when acted upon by other forces.

In some examples, the conductive particles 330 may be drawn together, by magnetic or electrical forces, to form an electrical connection across the activatable environmental indicator 200, transitioning the indicator to the conductive state, thus transitioning the electrical loop 115 to the closed state.

In some examples, the transport material 320 becomes conductive after liquefying, and an electrical connection is formed through the liquid transport material 320 and the conductive particles 330 to transition the indicator to the conductive state, thus transitioning the electrical loop 115 to the closed state.

Second Embodiment

FIG. 7-10 illustrate a second embodiment 200B of the activatable environmental indicator 200, according to embodiments of the present disclosure. The second embodiment 200B of the activatable environmental indicator 200 is a variation on the first embodiment 200A and further includes a wick 700. The second embodiment 200B has an unactivated nonconductive state (200B, FIG. 7), an activated nonconductive state (200B), FIG. 8), a transitionary state (200B", FIG. 9) and an activated conductive state (200B'"), FIG. 10). According to some examples, the second embodiment 200B undergoes a transition from the nonconductive state to the conductive state, responsive to the environmental stimulus, (e.g. following activation).

Figure 7:
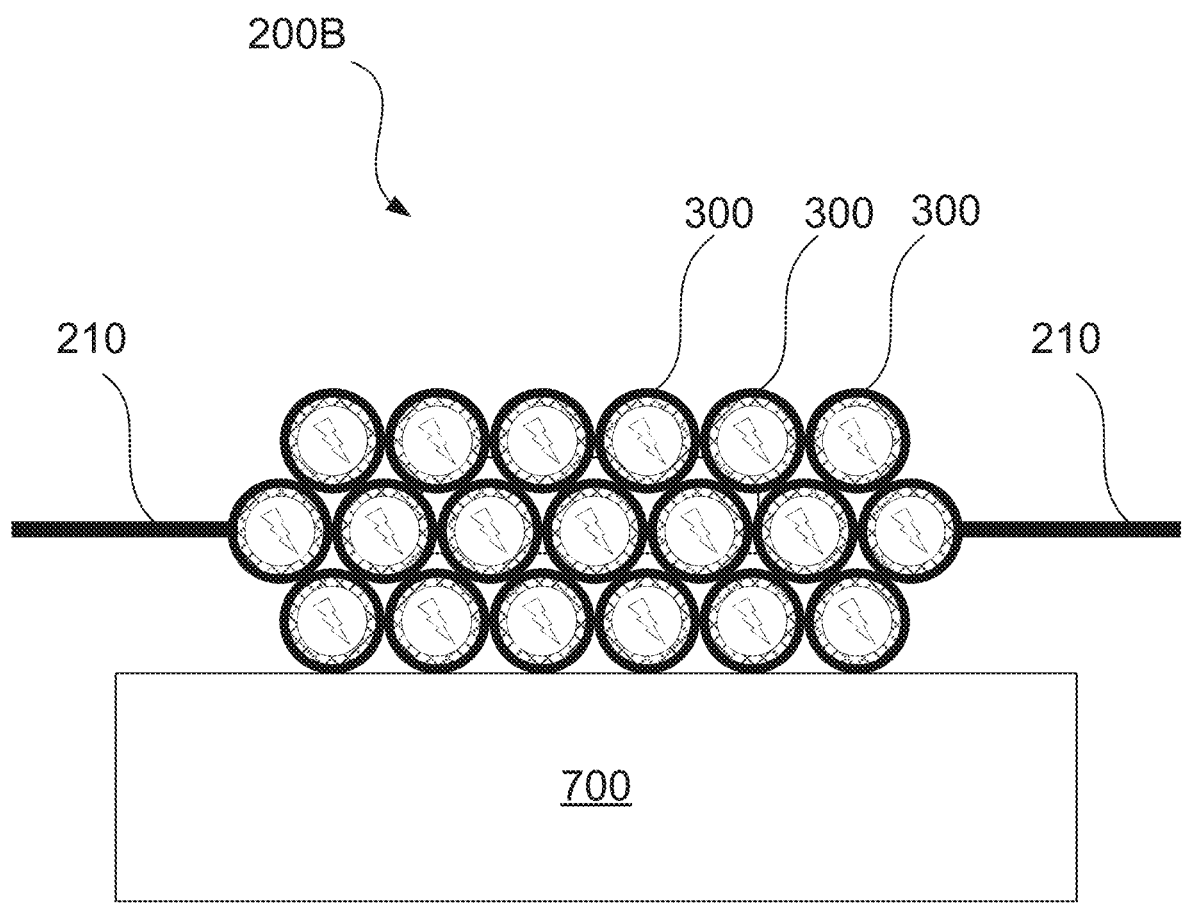
FIGS. 7-10 illustrate various conductive states of a second embodiment of an activatable environmental indicator, according to embodiments of the present disclosure.

FIG. 7 illustrates the second embodiment 200B of the activatable environmental indicator 200 in the unactivated nonconductive state, according to embodiments of the present disclosure. In the unactivated nonconductive state, the shells 310 of the microcapsules 300 resist, or substantially prevent, electrical connection across the wire 210 and through the activatable environmental indicator 200, such that the activatable environmental indicator 200 is in the nonconductive state, and the electrical loop 115 is open. In the unactivated state, the transport material 320 and conductive particles 330 are contained within the shells 310 of the microcapsule 300. In the unactivated nonconductive state, the transport material 320 may be in the liquid phase or the solid phase but is nonetheless contained by the shells 310.

In some examples, the wick 700 is disposed such that the wick 700 abuts the microcapsules 300. The wick 700 may be constructed of a wicking material and configured to be permeable with respect to the transport material 320 in the liquid phase, and impermeable with respect to the conductive particles 330, and the microcapsules 300.

Figure 8:
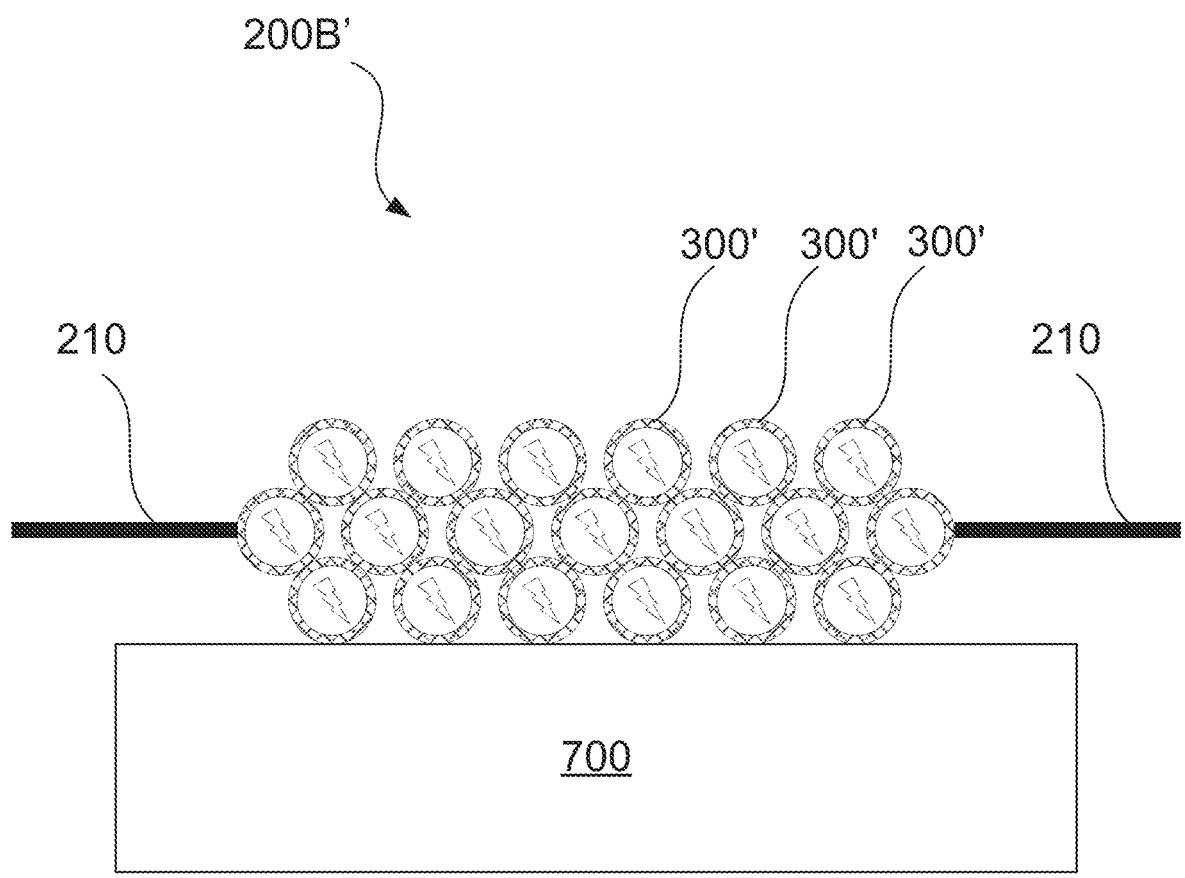

FIG. 8 illustrates the activated nonconductive state of the first embodiment 200B' of the activatable environmental indicator 200, according to embodiments of the present disclosure. After an application of an activation stress (e.g., heat, pressure, etc.) the shells 310 of the microcapsules 300 rupture or otherwise disengage, releasing the transport material 320, becoming ruptured microcapsules 300'. In some examples, the transport material 320 may be non-conductive in the solid phase, and electrical connection across the wire 210 and through the activatable environmental indicator 200 is still substantially prevented by the transport material 320, such that the activatable environmental indicator 200 remains in the nonconductive state, and the electrical loop 115 is open.

Figure 9:
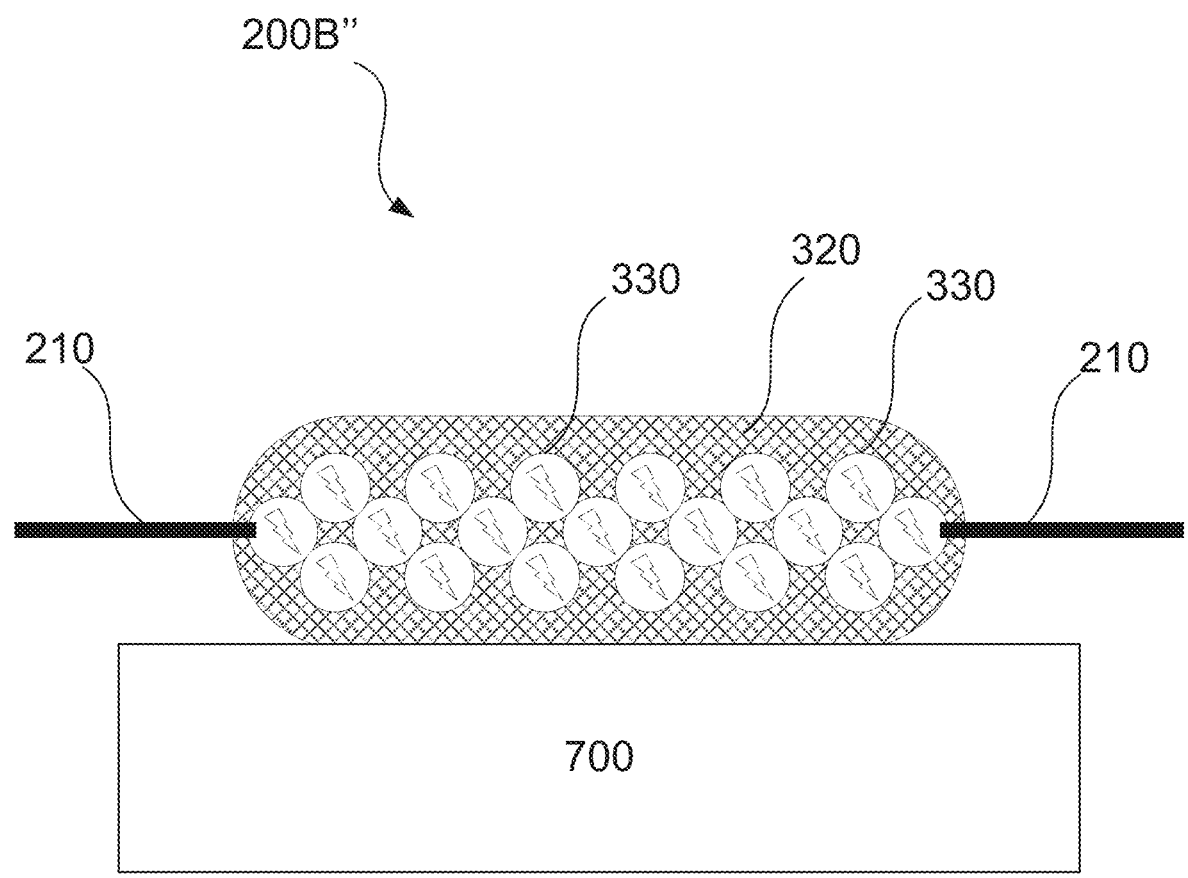

FIG. 9 illustrates the transitionary state of the first embodiment 200A'" of the activatable environmental indicator 200, between the activated nonconductive state and the activated conductive state, according to embodiments of the present disclosure. After an exposure to a predetermined environmental stimulus (e.g. as discussed in Detailed Description of FIG. 3), the transport material 320 of the ruptured microcapsules 300' liquefies. (If the material liquified prior to the rupture of the microcapsules, e.g., by heating above the melting point, it would be retained in the microcapsules, and return to solid state when the indicator cooled.) The conductive particles 330, which were previously held in a solid matrix by the transport material 320 in the solid phase when the activatable environmental indicator 200 was in the unactivated nonconductive state and the activated nonconductive state, are operable to move throughout the liquid transport material 320.

In some examples, the transport material 320 is nonconductive in both the liquid phase and in the solid phase. The conductive particles 330 may be drawn together, by magnetic or electrical forces, to form an electrical connection through the transport material 320, transitioning the activatable environmental indicator 200 to the conductive state, thus transitioning the electrical loop 115 to the open state. The transitional state may be only partially conductive, relative to the activated conductive state, and the conductive particles 330 may not be drawn together to an extent at which electrical connection is facilitated across the activatable environmental indicator 200, as the nonconductive transport material 320 may impair both movement of the conductive particles 330, as well as acts as a resistive barrier between particles. As such, the electrical loop 115 may be in the open state, but in some cases the electrical loop 115 may be in the closed state when the activatable environmental indicator 200 is in the transitional state.

Figure 10:
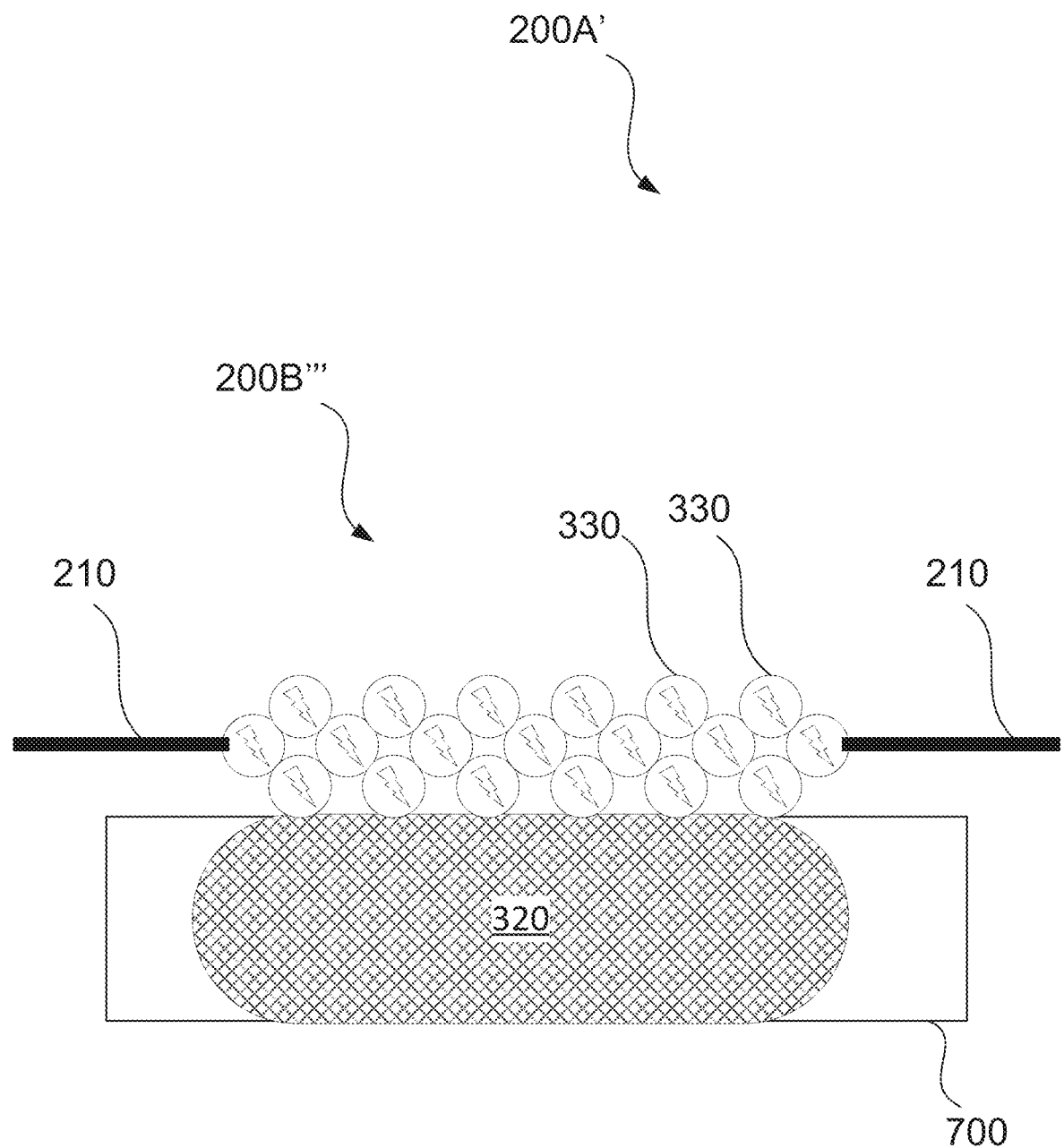

FIG. 10 illustrates the activated conductive state of the second embodiment 200B'" of the activatable environmental indicator 200, according to embodiments of the present disclosure. After the transport material 320 is liquidized by the predetermined environmental exposure, the liquid transport material 320 is drawn into the wick 700 by wicking action. The conductive particles 330, being too great in size to be drawn into the pores of the wick 700, remain disposed between the wires 210, and are drawn together (e.g. via gravity, and/or electromagnetic attraction) as the transport material 320 recedes into the wick 700, and the conductive particles 330 form the electrical connection between the wires 210, transitioning the activatable environmental indicator 200 to the conductive state, thus transitioning the electrical loop 115 to the closed state. The conductive particles 330 can be provided in sufficient quantity to form the electrical connection when the transport material is absorbed by the wick 700, as shown in FIG. 10.

Figure 11:
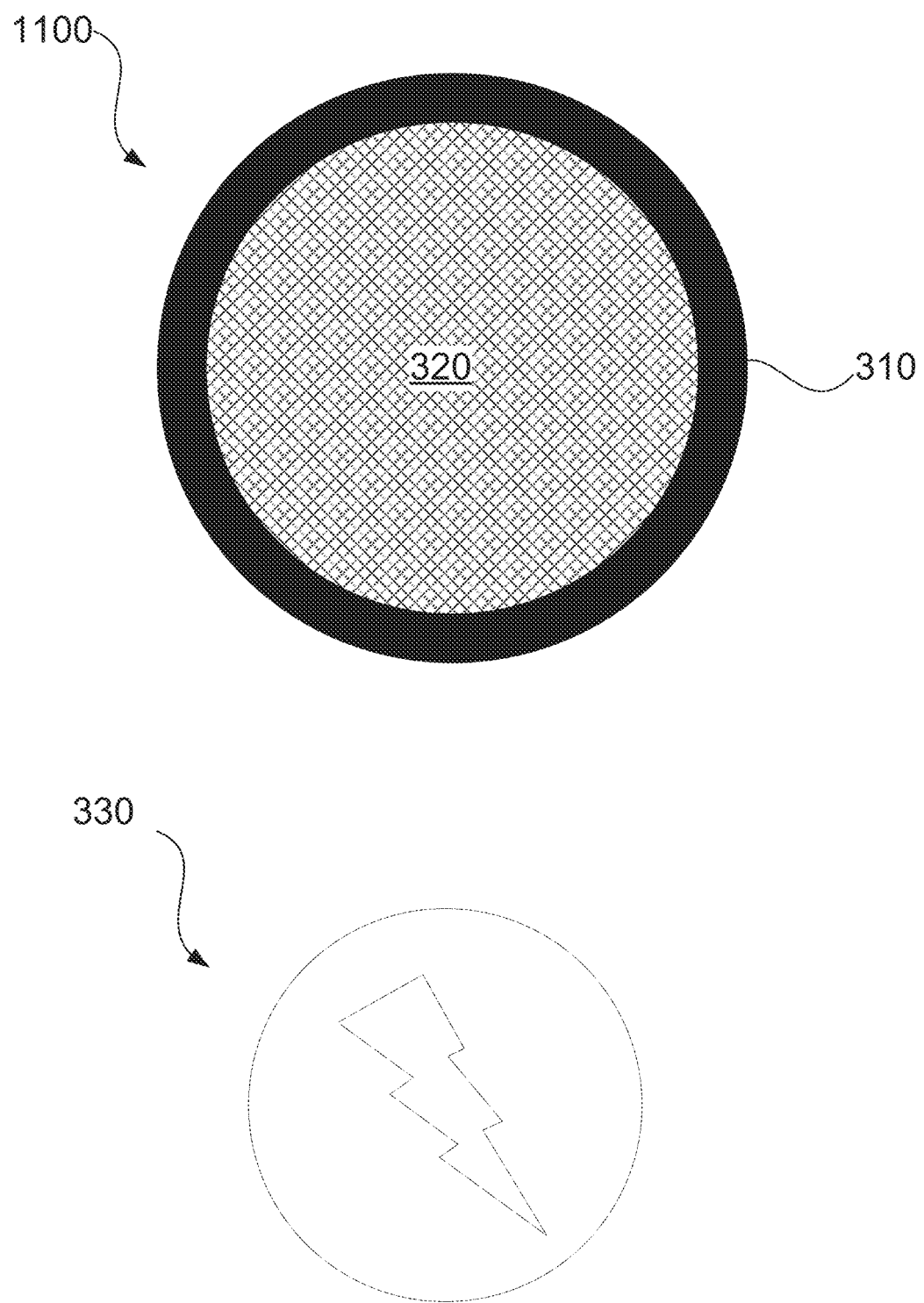
FIG. 11 illustrates a microcapsule and a conductive particle, according to embodiments of the present disclosure.

FIG. 11 illustrates a microcapsule 1100 and a conductive particle 330, according to embodiments of the present disclosure. The microcapsule 1100 contains a transport material 320 microencapsulated in an activatable shell 310. The conductive particle 330 is not contained within the microcapsule 1100.

FIGS. 12-15 illustrate embodiments of activatable environmental indicator 200 employing the microcapsules 1100 as discussed in reference to FIG. 11.

Third Embodiment

FIGS. 12-15 Illustrate a third embodiment 200C of the activatable environmental indicator 200 employing the microcapsule 1100 and the conductive particles 330, according to embodiments of the present disclosure. The third embodiment 200C further includes a wick 1200. In some examples, the wick 1200 is disposed such that the wick 1200 abuts the conductive particles 330. The third embodiment 200C has an unactivated conductive state (220C, FIG. 11), an activated conductive state (200C', FIG. 12), a transitionary state (200C'', FIG. 13) and an activated nonconductive state (200C''', FIG. 14). According to some examples, the third embodiment 200C undergoes a transition from the conductive state to the nonconductive state, responsive to the environmental stimulus, (e.g. following activation).

Figure 12:
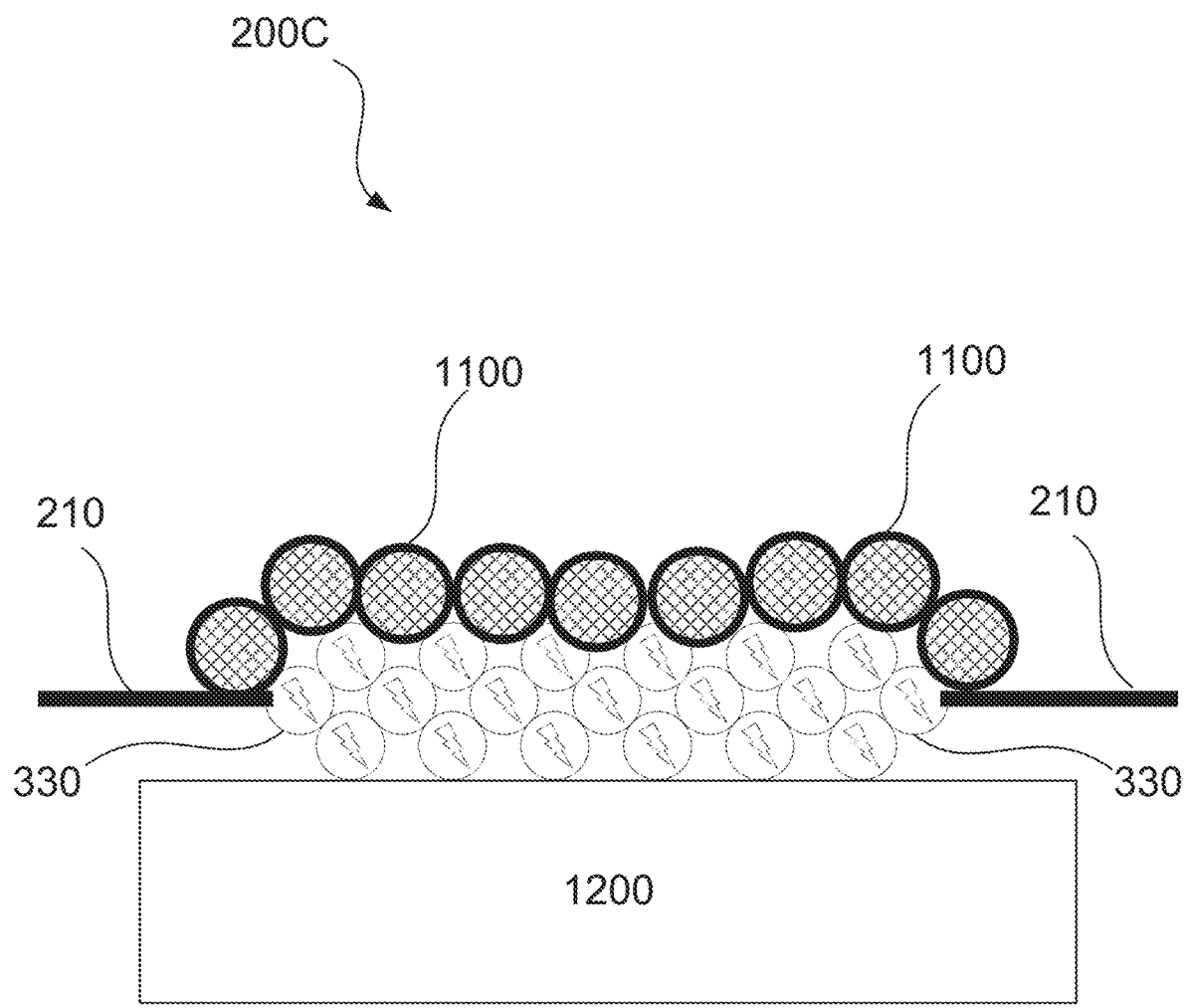
FIGS. 12-15 illustrate various conductive states of a third embodiment of an activatable environmental indicator, according to embodiments of the present disclosure.

FIG. 12 illustrates the unactivated conductive state of the third embodiment 200C of the activatable environmental indicator 200, according to embodiments of the present disclosure. The conductive particles 330 are provided in a conductive arrangement between the wires 210, such that the activatable environmental indicator 200 is in the conductive state and the electrical loop 115 is in the closed state. The wick 1200 is disposed such that the wick 1200 abuts the arrangement of conductive particles 330, and the microcapsules 1100 are disposed such that the microcapsules 1100 abut the conductive particles 330, opposed to the wick 1200.

Figure 13:
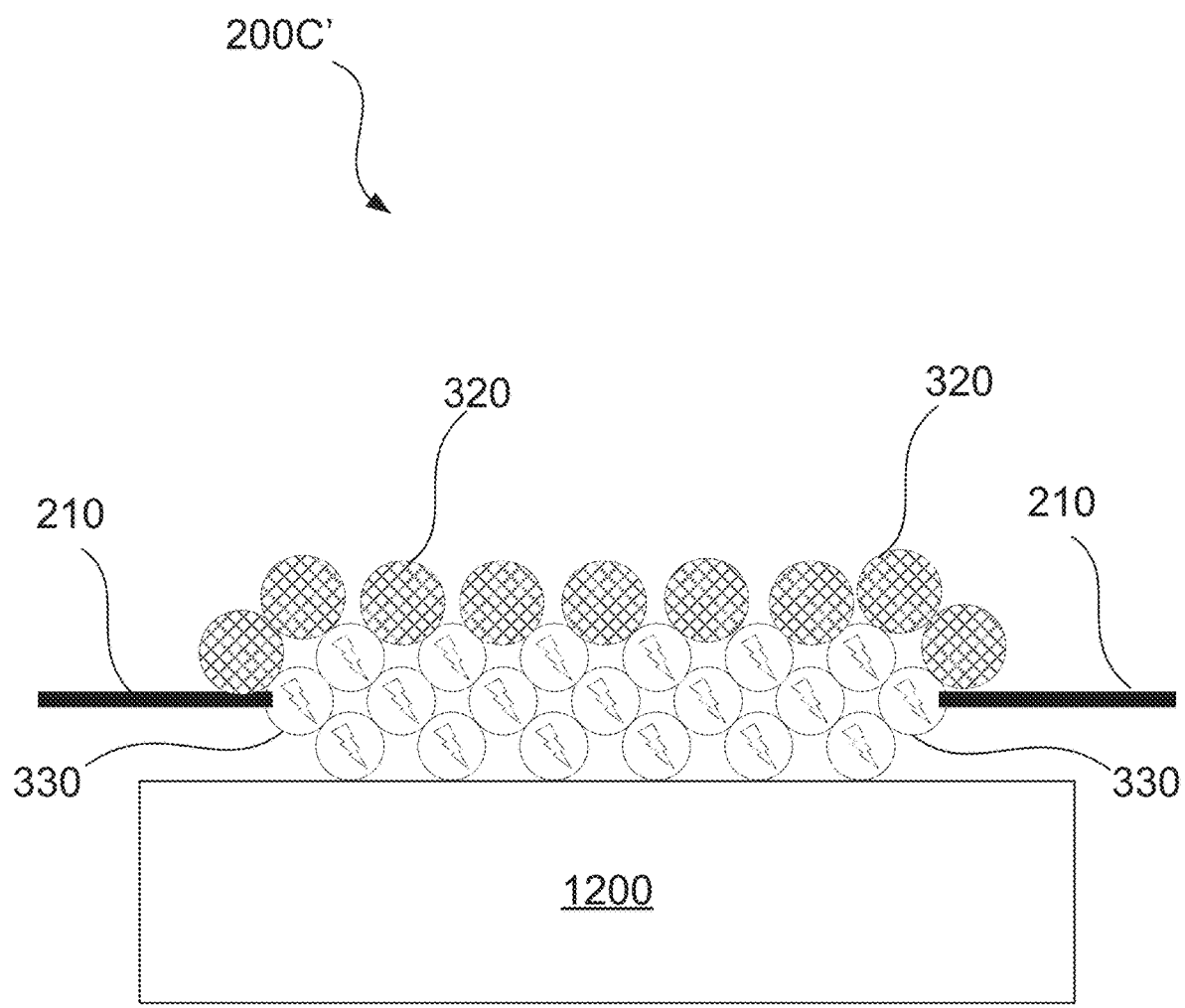

FIG. 13 illustrates the activated conductive state of the third embodiment 200C' of the activatable environmental indicator 200, according to embodiments of the present disclosure. After an application of an activation action (e.g., heat, pressure, etc.) the shells 310 of the microcapsules 300 rupture or otherwise disengage, releasing the transport material 320. The transport material 320 remains in the solid phase following the activation action, and thus does not have a significant effect on the conductive particles 330, nor the conduction of electricity therethrough.

Figure 14:
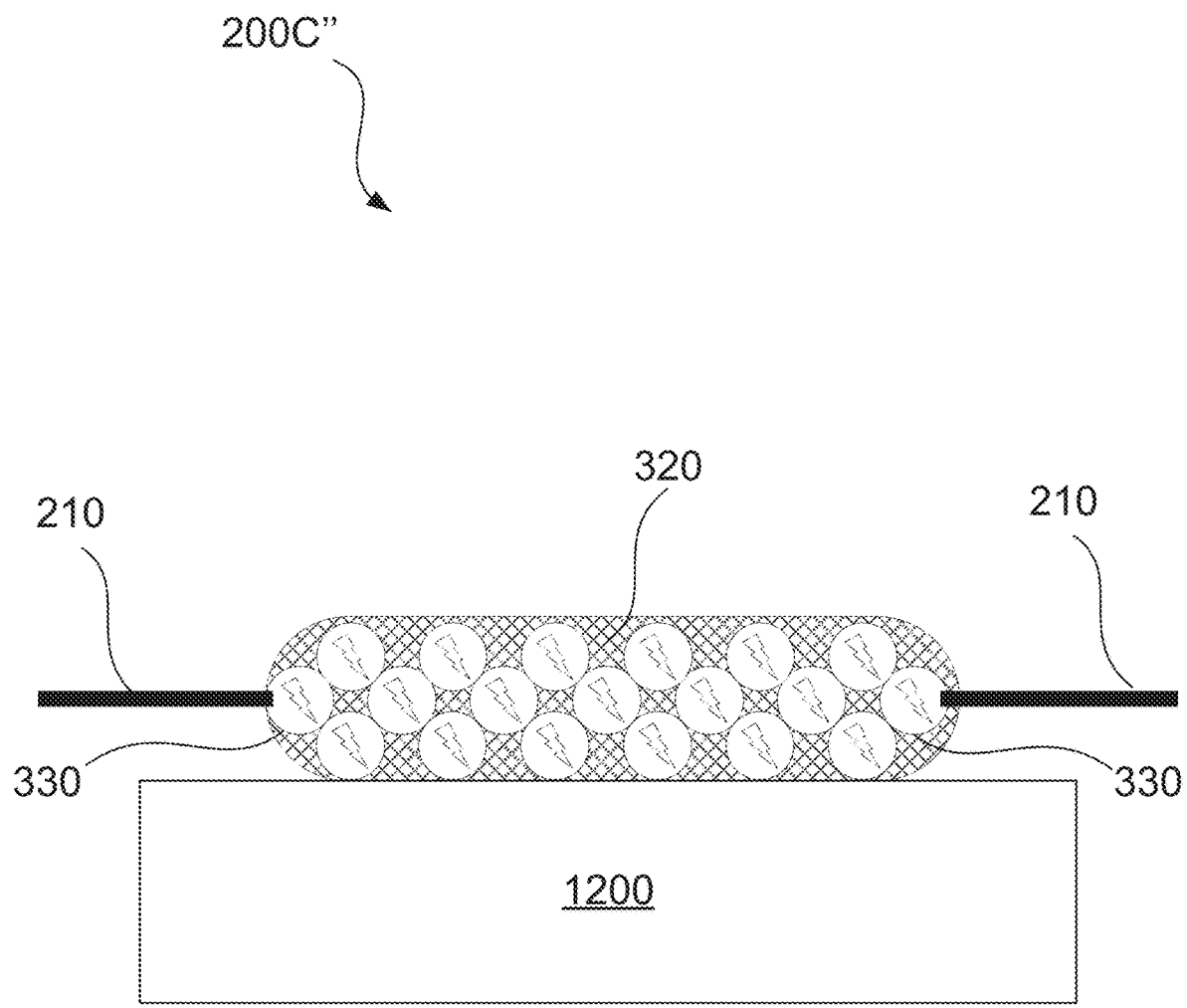

FIG. 14 illustrates the transitionary state of the third embodiment 200C'' of the activatable environmental indicator 200, between the activated conductive state and the activated nonconductive state, according to embodiments of the present disclosure. After an exposure to a predetermined environmental stimulus (e.g. as discussed in Detailed Description of FIG. 3), the transport material 320 liquefies. The liquid carrier material may then flow into the arrangement of conductive particles 330, where the transport material 320 may begin to disrupt electrical conduction therethrough. In some examples, the viscosity of the liquid transport material 320 is sufficient to move the conductive particles 330 and contract the conductive particles 330 into the flow of transport material 320.

In some examples, the transport material 320 is nonconductive in both the liquid phase and in the solid phase. The transitional state may be only partially conductive, relative to the activated conductive state, and the conductive particles 330 may not remain arranged together to an extent at which electrical connection is facilitated across the activatable environmental indicator 200, as the nonconductive transport material 320 may act as a resistive barrier between conductive particles 330. As such, the electrical loop 115 may be in the open state, but in some cases the electrical loop 115 may be in the closed state when the activatable environmental indicator 200 is in the transitional state.

Figure 15:
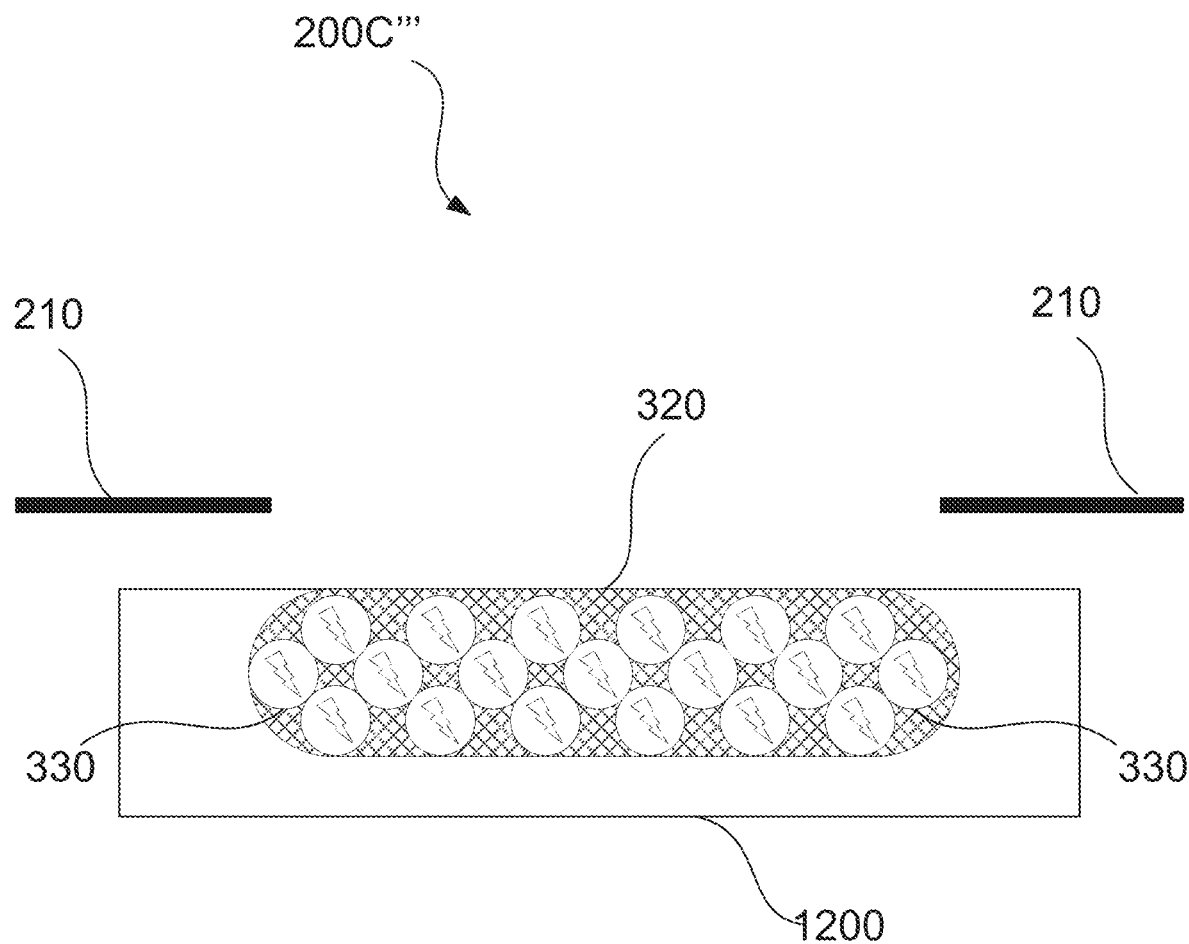

FIG. 15 illustrates the activated conductive state of the third embodiment 200C''' of the activatable environmental indicator 200, according to embodiments of the present disclosure. After the transport material 320 is liquidized by the predetermined environmental exposure, the liquid transport material 320 is drawn into the wick 1200 by wicking action, simultaneously drawing the conductive particles 330 into the wick. The wick 1200 of the third embodiment 200C is distinct from the wick 700 of the second embodiment 200B in that the wick of the third embodiment 200C has a pore size sufficient for permeability with respect to the conductive particles 330, such that the transport material 320 draws the conductive particles 330 into the wick 1200 as described above. As the conductive particles 330 are drawn into the wick 1200, the electrical connection between the wires 210 is disrupted, and thus the activatable environmental indicator 200 transitions to the activated nonconductive state and the electrical loop 115 is in the open state.

Figure 16:
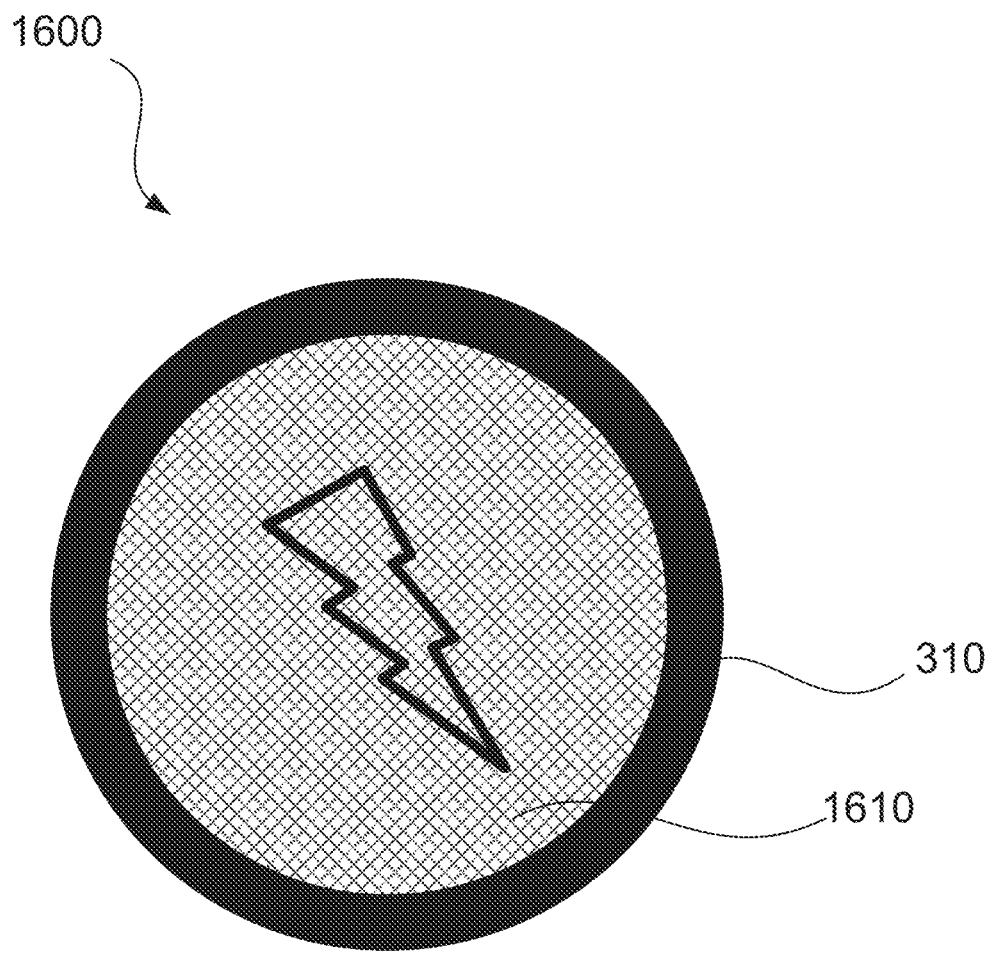
FIG. 16 illustrates a microcapsule, according to embodiments of the present disclosure.

FIG. 16 illustrates a microcapsule 1600, according to embodiments of the present disclosure. The microcapsule 1600 contains a conductive material, such as a conductive adhesive 1610 microencapsulated in an activatable shell 310.

In some examples, the conductive adhesive 1610 includes a transport material 320 blended with conductive materials to form a liquifiable conductive substance. The transport material 320 may be any such material capable of exhibiting a phase change from a solid phase to a liquid phase upon the occurrence of a predetermined environmental stimulus. The conductive material in the conductive adhesive 1610 may include particles or microparticles of conductive metals, such as copper, silver, gold, aluminum, zinc, tin, similar metals, and alloys thereof. The conductive material in the conductive adhesive 1610 may also or alternatively include particles or microparticles of graphene, graphite, graphene oxides, and other functionalized graphenes, and particles containing conductive non-metals.

FIGS. 17-20 illustrate embodiments of activatable environmental indicator 200 employing the microcapsules 1600 as discussed in reference to FIG. 16.

Fourth Embodiment

FIGS. 17-20 illustrate a fourth embodiment 200D of the activatable environmental indicator 200 according to embodiments of the present disclosure. In the fourth embodiment 200D, the activatable environmental indicator 200 includes a wick 1700 and microcapsules 1600 containing a conductive adhesive 1610, arranged such that the wick 1700 abuts the wire, and the microcapsules 1600 are disposed adjacent to the wick 1700. The fourth embodiment 200D has an unactivated nonconductive state (220C, FIG. 17), an activated nonconductive state (200D', FIG. 18), a transitionary state (200D", FIG. 19) and an activated conductive state (200D"'), FIG. 20). According to some examples, the fourth embodiment 200D undergoes a transition from the nonconductive state to the conductive state, responsive to the environmental stimulus, (e.g. following activation).

Figure 17:
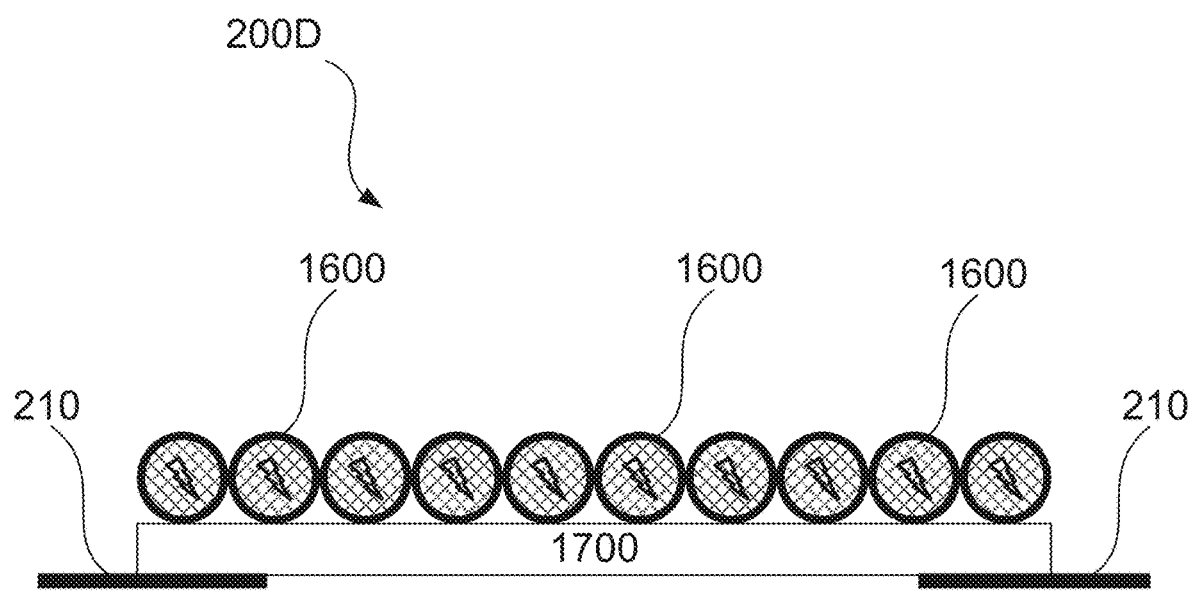
FIGS. 17-20 illustrate various conductive states of a fourth embodiment of an activatable environmental indicator, according to embodiments of the present disclosure.

FIG. 17 illustrates the fourth embodiment 200D of the activatable environmental indicator 200 in the unactivated nonconductive state, according to embodiments of the present disclosure. In the unactivated nonconductive state, the microcapsules 1600 are physically isolated from contact with the wires 210 by the wick 1700, and the conductive adhesive 1610 contained within the microcapsule 1600 is further barred from contact with the wires 210 by the shells 310 of the microcapsules 1600. As the wick 1700 is nonconductive alone, the activatable environmental indicator 200 is in the nonconductive state, and thus the electrical loop 115 is in the open state.

Figure 18:
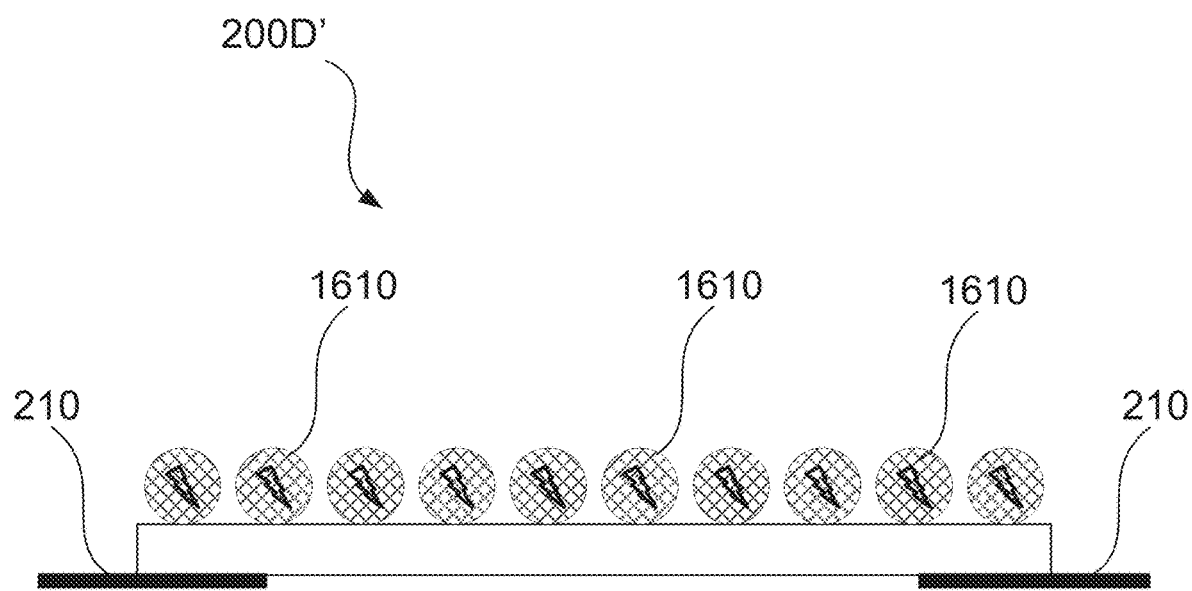

FIG. 18 illustrates the fourth embodiment 200D' of the activatable environmental indicator 200 in the activated nonconductive state, according to embodiments of the present disclosure. After an application of an activation action (e.g., heat, pressure, etc.) the shells 310 of the microcapsules 1600 rupture or otherwise disengage, exposing the conductive adhesive 1610 to the environment. The conductive adhesive 1610 remains in the solid phase and out of contact with the wires 210, thus nonconductive state of the activatable environmental indicator 200 is maintained.

Figure 19:
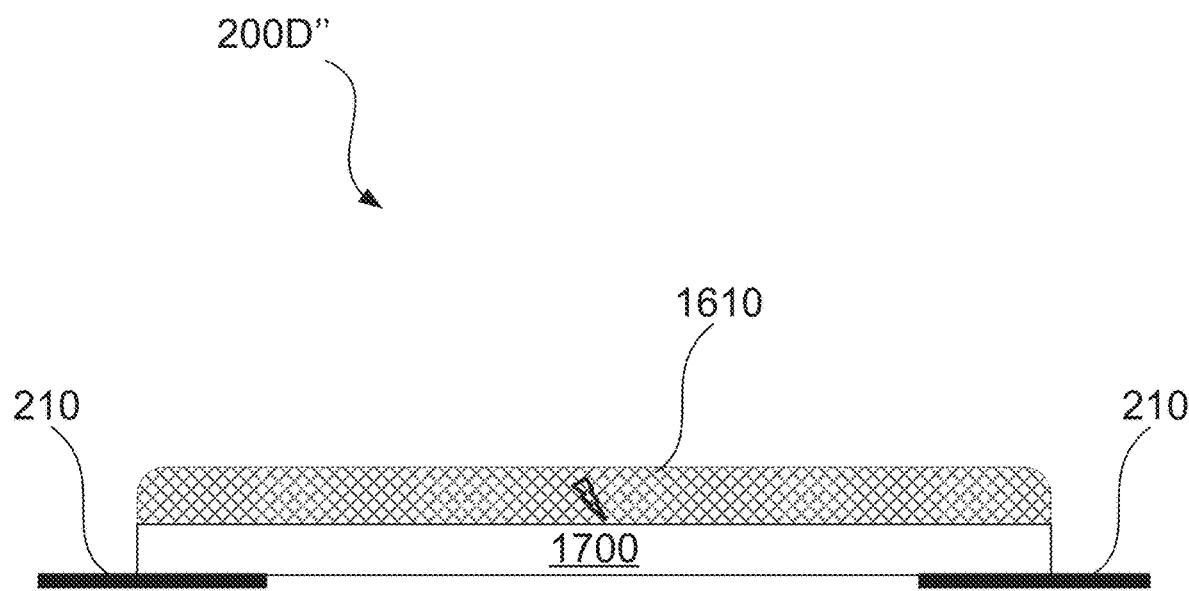
Figure 20:
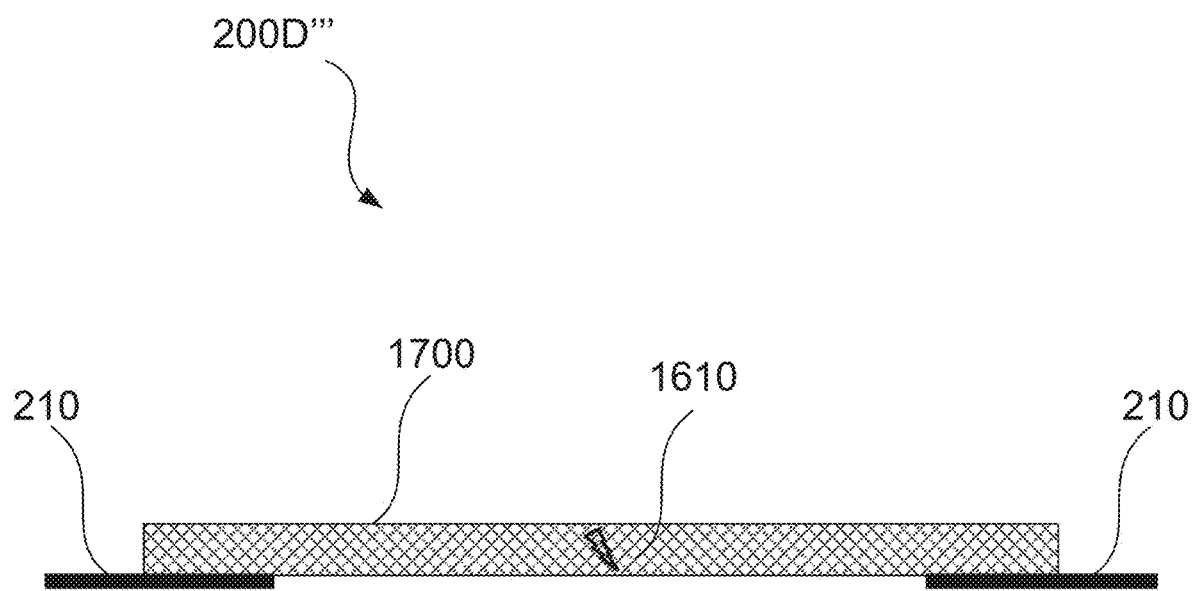

FIG. 19 illustrates the transitional state of the fourth embodiment 200D" of the activatable environmental indicator 200, according to embodiments of the present disclosure. After an exposure to a predetermined environmental stimulus (e.g. as discussed in Detailed Description of FIG. 3), the conductive adhesive 1610 liquefies. The liquid conductive adhesive 1610 may then begin to flow into the wick 1700. As the liquid conductive adhesive 1610 begins to flow into the wick 1700, the wick 1700 serves as a support structure for the conductive adhesive 1610. As the conductive adhesive 1610 saturates (e.g., fills the pores of) the wick 1700, the saturated portions of the wick 1700 become electrically conductive due to the presence of the conductive adhesive 1610.

In some examples, the transitional state may be only partially conductive, relative to the activated conductive state, as saturation of the wick 1700 may not yet be sufficient to support electrical connection across the activatable environmental indicator 200, as the wick 1700 is nonconductive alone. As such, the electrical loop 115 may be in the closed state, but in some cases the electrical loop 115 may be in the open state when the fourth embodiment 200D"' of the activatable environmental indicator 200 is in the transitional state.

FIG. 15 illustrates the activated conductive state of the fourth embodiment 200D"' of the activatable environmental indicator 200, according to embodiments of the present disclosure. After the conductive adhesive 1610 is liquidized by the predetermined environmental exposure, the liquid conductive adhesive 1610 is drawn into the wick 1700 by wicking action, saturating the wick 1700. In the activated conductive state, wick 1700 becomes sufficiently saturated to facilitate electrical connection across the activatable environmental indicator 200, such that the activatable environmental indicator 200 is in the conductive state and thus the electrical loop 115 is in the closed state.

In some examples, after a predetermined period of time, or secondary exposure, the conductive adhesive 1610 may cure, or otherwise harden, securing the wick 1700 to the wires 210, such that the environmental indicator 200 remains in the conductive state indefinitely. In such an example, the transition of the environmental indicator 200 from the nonconductive state to the conductive state is irreversible.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises." "comprising." "has", "having." "includes", "including." "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A radiofrequency identification (RFID) tag, comprising:
   an antenna;
   an integrated circuit, electrically connected to the antenna;
   an electrical loop having an open state and a closed state, the electrical loop electrically connected to the integrated circuit;
   an activatable environmental exposure indicator included as a portion of the electrical loop, the indicator having a conductive state and a nonconductive state, such that the electrical loop is in the closed state when the activatable environmental exposure indicator is in the conductive state and the electrical loop is in the open state when the activatable environmental exposure indicator is in the nonconductive state;
   wherein the activatable environmental exposure indicator includes a plurality of activable microcapsules, each microcapsule having a conductive particle embedded in a transport material, microencapsulated in a nonconductive shell;
   wherein the transport material is configured to liquefy responsive to a predetermined environmental exposure;
   wherein the nonconductive shells are configured to contain the transport material when liquefied;
   wherein the nonconductive shells are configured to rupture in response to an application of an activation action exceeding a predetermined activation threshold, releasing the indicator material;
   wherein the activatable environmental exposure indicator transitions to the conductive state when the nonconductive shells are ruptured responsive to the activation action and the transport material is liquefied responsive to the predetermined environmental exposure; and
   wherein the integrated circuit is configured, responsive to the RFID tag being interrogated by an interrogation signal in a predetermined radiofrequency range which is received by the antenna, to engage in a response behavior, wherein the response behavior corresponds to whether the electrical loop is in the open state or the closed state, and the response behavior is selected from a group consisting of:
      (a) cause the antenna to emit a response signal responsive to the interrogation signal when the electrical loop is in the open state, and not emit the response signal responsive to the interrogation signal when the electrical loop is in the closed state,
      (b) cause the antenna to emit the response signal responsive to the interrogation signal when the electrical loop is in the closed state, and not emit the response signal responsive to the interrogation signal when the electrical loop is in the open state,
      (c) cause the antenna to emit a first distinct response signal responsive to the interrogation signal when the electrical loop is in the closed state and emit a second distinct response signal responsive to the interrogation signal when the electrical loop is in the open state.

2. The RFID tag of claim 1, wherein the first distinct response signal has a first radiofrequency response, and the second distinct response signal has a second radiofrequency response.

3. The RFID tag of claim 1, wherein the integrated circuit contains a memory, and the first distinct response signal contains a first data stored in the memory, and the second distinct response signal contains a second data stored in the memory.

4. The RFID tag of claim 1, wherein the RFID tag is a passive RFID tag, and the interrogation signal received by the antenna powers the integrated circuit to engage in the response behavior.

5. The RFID tag of claim 1, further comprising a battery, wherein the integrated circuit is electrically connected to the battery and powered by the battery.

6. The RFID tag of claim 1, wherein the activation action is thermal stress with a predetermined activation threshold selected from a group consisting of: a temperature exceeding 35 degrees Celsius (C), a temperature exceeding 40 degrees C., a temperature exceeding 45 degrees C., a temperature exceeding 50 degrees C., a temperature exceeding 55 degrees C., a temperature exceeding 60 degrees C., a temperature exceeding 65 degrees C., a temperature exceeding 70 degrees C., a temperature exceeding 75 degrees C., a temperature exceeding 80 degrees C., a temperature exceeding 85 degrees C., a temperature exceeding 90 degrees C., a temperature exceeding 95 degrees C., and a temperature exceeding 100 degrees C.

7. The RFID tag of claim 1, wherein the activation action is a compression stress with a predetermined activation threshold selected from a group consisting of: a stress exceeding 0.1 pounds per square inch (psi) a stress exceeding 0.5 psi, a stress exceeding 1 psi, a stress exceeding 2 psi, a stress exceeding 5 psi, a stress exceeding 10 psi, and a stress exceeding 15 psi.

8. The RFID tag of claim 1, wherein the activation action is a shear stress with a predetermined activation threshold selected from a group consisting of: a stress exceeding 0.1 psi a stress exceeding 0.5 psi, a stress exceeding 1 psi, a stress exceeding 2 psi, a stress exceeding 5 psi, a stress exceeding 10 psi, and a stress exceeding 15 psi.

9. The RFID tag of claim 1, wherein the predetermined environmental exposure is selected from a group consisting of: a temperature excursion above a predetermined temperature, a temperature excursion above a predetermined temperature threshold for at least a predetermined amount of time, a temperature excursion below a predetermined temperature, a temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, a predetermined electromagnetic exposure, a humidity exposure, an exposure to a humidity level above a predetermined threshold, and an exposure to a humidity level above a predetermined threshold for at least a predetermined amount of time.

10. The RFID tag of claim 1, wherein the conductive particles are selected from a group consisting of: particles containing copper, particles containing silver, particles containing graphite, particles containing graphene, particles containing graphene oxide, particles containing other functionalized graphenes, particles containing conductive metals, particles containing conductive non-metal materials, and combinations thereof.

11. The RFID tag of claim 1, wherein the nonconductive shells comprise a material selected from the group consisting of: a protein, a gel, a polyurea formaldehyde, a polymelamine formaldehyde, a wax material, an emulsion, other polymeric materials, and combinations thereof.

12. The RFID tag of claim 1, wherein the transport material comprises a material selected from the group consisting of: a side-chain crystallizable polymer, an alkane, a wax, an alkane wax, esters, and combinations thereof.

13. The RFID tag of claim 1, wherein each respective transport material is electrically nonconductive when not liquefied, and electrically conductive when liquefied, such that an electrical connection is formed through the transport material when liquefied and each respective conductive particle to transition the activatable environmental exposure indicator to the conductive state, and thus transitioning the electrical loop to the closed state.

14. The RFID tag of claim 1, wherein each respective transport material is nonconductive, and each respective transport material when liquefied facilitates an electrical connection between each respective conductive particle to transition the activatable environmental exposure indicator to the conductive state, and thus transitioning the electrical loop to the closed state.

15. The RFID tag of claim 1, further comprising a wicking material abutting the portion of the electrical loop formed by the activatable environmental exposure indicator, the wicking material being permeable with respect to the transport material when liquefied, impermeable with respect to the nonconductive transport material when not liquefied, impermeable with respect to the microcapsules, and impermeable with respect to the conductive particles, such that when the activatable environmental exposure indicator has been subjected to the activation action and subjected to the predetermined environmental exposure, the wicking material draws the liquefied transport material into the wicking material, facilitating the conductive particles to abut one another, facilitating the activatable environmental exposure indicator to transition to the conductive state, and thus transitioning the electrical loop to the closed state.

16. The RFID tag of claim 1, wherein when the electrical loop transitions from the closed state, the transition is irreversible.

17. A radiofrequency identification (RFID) tag, comprising:
    an antenna;
    an integrated circuit, electrically connected to the antenna;
    an electrical loop having an open state and a closed state, the electrical loop electrically connected to the integrated circuit;
    an activatable environmental exposure indicator included as a portion of the electrical loop, the indicator having a conductive and a nonconductive state, such that the electrical loop is in the closed state when the activatable environmental exposure indicator is in the conductive state and the electrical loop is in the open state when the activatable environmental exposure indicator is in the nonconductive state;
    wherein the activatable environmental exposure indicator includes a plurality of conductive particles forming an electrical connection such that the activatable environmental exposure indicator is in the conductive state, a wicking material, abutting the plurality of conductive particles; a plurality of activable microcapsules, each microcapsule containing a transport material microencapsulated in a nonconductive shell, activatable microcapsules abutting the conductive particles and opposed to the wicking material;
    wherein the transport material is configured to liquefy responsive to a predetermined environmental exposure;
    wherein the nonconductive shells are configured to contain the transport material when liquefied;
    wherein the nonconductive shells are configured to rupture in response to an application of an activation action exceeding a predetermined activation threshold, releasing the transport material;
    wherein the activatable environmental exposure indicator transitions to the nonconductive state when the nonconductive shell is ruptured and the transport material is liquefied, and the wicking material draws the transport material and the conductive particles into the wicking material; and
    wherein the integrated circuit is configured, responsive to the RFID tag being interrogated by an interrogation signal in a predetermined radiofrequency range which is received by the antenna, to engage in a response behavior, wherein the response behavior corresponds to whether the electrical loop is in the open state or the closed state, and the response behavior is selected from a group consisting of:
    (a) emit a response signal responsive to the interrogation signal when the electrical loop is in the open state, and not emit the response signal responsive to the interrogation signal when the electrical loop is in the closed state;
    (b) emit the response signal responsive to the interrogation signal when the electrical loop is in the closed state, and not emit the response signal responsive to the interrogation signal when the electrical loop is in the open state;
    (c) emit a first distinct response signal responsive to the interrogation signal when the electrical loop is in the closed state and emit a second distinct response signal responsive to the interrogation signal when the electrical loop is in the open state.

18. The RFID tag of claim 17, wherein the first distinct response signal has a first radiofrequency response, and the second distinct response signal has a second radiofrequency response.

19. A radiofrequency identification (RFID) tag comprising:
    an antenna;
    an integrated circuit, electrically connected to the antenna;
    an electrical loop having an open state and a closed state, the electrical loop electrically connected to the integrated circuit;

an activatable environmental exposure indicator included as a portion of the electrical loop, the indicator having a conductive and a nonconductive state, such that the electrical loop is in the closed state when the activatable environmental exposure indicator is in the conductive state and the electrical loop is in the open state when the activatable environmental exposure indicator is in the nonconductive state;

wherein the activatable environmental exposure indicator includes a plurality of activable microcapsules, each microcapsule of the plurality of activatable microcapsules having a respective portion of a conductive adhesive encapsulated in a nonconductive shell of a plurality of nonconductive shells, and a wicking material, abutting the plurality of activatable microcapsules;

wherein the conductive adhesive is configured to liquefy responsive to a predetermined environmental exposure;

wherein the nonconductive shells are configured to contain the conductive adhesive when the conductive adhesive is liquefied;

wherein the nonconductive shells are configured to rupture in response to an application of an activation action exceeding a predetermined activation threshold, releasing the conductive adhesive;

wherein the activatable environmental exposure indicator transitions to the conductive state when the nonconductive shell is ruptured responsive to the activation action and the conductive adhesive is liquified responsive to the predetermined environmental exposure, such that the wicking material draws the conductive adhesive into the wick, and an electrical connection is formed through the wick via the conductive adhesive; and wherein the integrated circuit is configured, responsive to the RFID tag being interrogated by an interrogation signal in a predetermined radiofrequency range which is received by the antenna, to engage in a response behavior, wherein the response behavior corresponds to whether the electrical loop is in the open state or the closed state, and the response behavior is selected from a group consisting of:

(a) emit a response signal responsive to the interrogation signal when the electrical loop is in the open state, and not emit the response signal responsive to the interrogation signal when the electrical loop is in the closed state, (b) emit the response signal responsive to the interrogation signal when the electrical loop is in the closed state, and not emit the response signal responsive to the interrogation signal when the electrical loop is in the open state, (c) emit a first distinct response signal responsive to the interrogation signal when the electrical loop is in the closed state and emit a second distinct response signal responsive to the interrogation signal when the electrical loop is in the open state.

20. The RFID tag of claim 19, wherein after the activatable environmental exposure indicator transitions to the conductive state, the conductive adhesive cures, securing the wick to the electrical loop, such that the transition is irreversible.

21. The RFID tag of claim 19, wherein the predetermined environmental exposure is selected from a group consisting of: a temperature excursion above a predetermined temperature threshold for at least a predetermined amount of time, temperature excursion below a predetermined temperature for at least a predetermined amount of time, cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, a predetermined electromagnetic exposure, a humidity exposure, an exposure to a humidity level above a predetermined threshold, and an exposure to a humidity level above a predetermined threshold for at least a predetermined amount of time.

22. The RFID tag of claim 19, wherein the conductive adhesive comprises a material selected from a group consisting of: particles containing copper, particles containing silver, particles containing graphite, particles containing graphene, particles containing graphene oxide, particles containing other functionalized graphenes, particles containing conductive metals, particles containing conductive non-metal materials, and combinations thereof.

23. The RFID tag of claim 19, wherein the nonconductive shells comprise a material selected from the group consisting of: a protein, a gel, a polyurea formaldehyde, a polymelamine formaldehyde, a wax material, an emulsion, other polymeric materials, and combinations thereof.

* * * * *